US012714025B2

(12) United States Patent
Modak et al.

(10) Patent No.: US 12,714,025 B2
(45) Date of Patent: Aug. 25, 2026

(54) SYSTEMS AND METHODS FOR TENSIONING ENDLESS BELTS

(71) Applicant: Deere & Company, Moline, IL (US)

(72) Inventors: Shreyas P. Modak, Silvis, IL (US); Piyush Joshi, Pune (IN); Duane M. Bomleny, Geneseo, IL (US)

(73) Assignee: Deere & Company, Moline, IL (US)

( * ) Notice: Subject to any disclaimer, the term of this patent is extended or adjusted under 35 U.S.C. 154(b) by 379 days.

(21) Appl. No.: 18/470,486

(22) Filed: Sep. 20, 2023

(65) Prior Publication Data

US 2025/0089617 A1 Mar. 20, 2025

(51) Int. Cl.

| | |
|---|---|
| ***A01D 57/20*** | (2006.01) |
| ***B65G 23/44*** | (2006.01) |
| ***B65G 43/00*** | (2006.01) |
| ***G06T 7/00*** | (2017.01) |
| ***G06T 7/70*** | (2017.01) |

(52) U.S. Cl.

CPC ............. *A01D 57/20* (2013.01); *B65G 23/44* (2013.01); *B65G 43/00* (2013.01); *G06T 7/70* (2017.01); *G06T 7/0004* (2013.01)

(58) Field of Classification Search

CPC ........ A01D 57/20; B65G 23/44; B65G 43/04; B65G 2203/0283; B65G 2203/041; G06T 7/0004; G06T 7/70

USPC ..................................................... 198/810.04

See application file for complete search history.

(56) References Cited

U.S. PATENT DOCUMENTS

| | | | | |
|---|---|---|---|---|
| 3,104,007 A | | 9/1963 | Swezey et al. | |
| 3,414,115 A | | 12/1968 | Gates et al. | |
| 3,422,953 A | * | 1/1969 | Gates | A01D 61/00 198/814 |
| 3,956,632 A | | 5/1976 | Hall et al. | |
| 5,647,640 A | * | 7/1997 | Heintzmann | E21C 27/34 198/810.04 |
| 6,029,798 A | * | 2/2000 | Miller | B65G 43/02 198/810.04 |
| 7,921,987 B2 | | 4/2011 | Kitamura | |
| 9,221,617 B2 | * | 12/2015 | Waller | B65G 23/44 |
| 2003/0045966 A1 | | 3/2003 | Ubaldi | |

(Continued)

FOREIGN PATENT DOCUMENTS

| | | | | |
|---|---|---|---|---|
| AU | 2022252793 A1 | * | 11/2022 | B65G 23/44 |
| DE | 4413321 A1 | * | 10/1995 | B65G 23/44 |

OTHER PUBLICATIONS

Tyler Crews et al., Auto Tensioning System for John Deere Draper Belt, Purdue University Capstone Experience 2014, pp. 1.

(Continued)

*Primary Examiner* — James R Bidwell

(57) ABSTRACT

A method for tensioning an endless belt may include determining a first tension level in a conveyor belt of a conveyor assembly; comparing the first tension level to a desired tension level in the conveyor belt of the conveyor assembly; in response to the first tension level not corresponding to the desired tension level in the conveyor belt of the conveyor assembly, determining one of a slip condition of the conveyor belt and a stall condition of the conveyor belt; and determining a second tension level of the conveyor belt based on the first tension level of the conveyor belt and the one of the slip condition of the conveyor belt and the stall condition of the conveyor belt.

20 Claims, 14 Drawing Sheets

(56) References Cited

U.S. PATENT DOCUMENTS

| | | | | |
|---|---|---|---|---|
| 2005/0000367 | A1 | 1/2005 | Meade | |
| 2016/0075519 | A1* | 3/2016 | Waller | B65G 43/00 198/810.04 |
| 2016/0360699 | A1* | 12/2016 | Allochis | A01D 41/14 |
| 2018/0359921 | A1 | 12/2018 | Brimeyer | |
| 2019/0112133 | A1* | 4/2019 | Smith | G01C 3/06 |
| 2019/0367286 | A1* | 12/2019 | Engelmann | E01C 23/088 |

OTHER PUBLICATIONS

Modak et al., Systems and Methods for Tensioning Endless Belts, U.S. Appl. No. 18/470,501, filed Sep. 20, 2023, 62 pages (specification and drawings).

* cited by examiner 500
502
504
506
508
510
512
514
516
517
518
520
522
524
526
528
530
532
534
536
538
540
542
544
546
501,548

620
626

628
618
610
608
622
602
605
612
624
616
606
604
600
614

814
824
828
830
826

802
822
816
810
812
820
804,806
800
818

1100
1104

1120
1132
1127
1128
1116
1132
1126
1130
1130
1126
1124
1124
1110
1108
1112
1102
1122
1106
1118
1122
1114

SYSTEMS AND METHODS FOR TENSIONING ENDLESS BELTS

FIELD OF THE DISCLOSURE

The present disclosure relates generally to belt tension systems and methods and, particularly, belt tension systems and methods in the context of agricultural vehicles.

BACKGROUND OF THE DISCLOSURE

Agricultural harvesters use a variety of attached implements to gather crops. A "draper" or "draper header" is one such type of these implements. Generally, a draper header uses conveyors with endless belts to carry cut crop material from leading-edge knives to a center region of the header. From there, the cut crop material is conveyed into the harvester. Once in the harvester, the cut crop material is further processed by separating grain from unwanted crop material (typically called "material other than grain" or "MOG").

SUMMARY OF THE DISCLOSURE

An example aspect of the present disclosure is directed to an apparatus to adjust tension in a conveyor belt of an industrial machine that may include one or more processors and a non-transitory computer-readable storage medium coupled to the one or more processors and storing programming instructions for execution by the one or more processors. The programming instructions may instruct the one or more processors to: determine a tension level in a conveyor belt of a conveyor assembly; compare the tension level to a desired tension level in the conveyor belt of the conveyor assembly; in response to the tension level not corresponding to the desired tension level in the conveyor belt of the conveyor assembly, determine one of a slip condition of the conveyor belt and a stall condition of the conveyor belt; and determine an adjustment to the tension level of the conveyor belt based on the tension level of the conveyor belt and the one of the slip condition of the conveyor belt and the stall condition of the conveyor belt.

Another example aspect of the present disclosure is directed to non-transitory computer readable medium storing instructions to cause a processor to perform operations that may include: determining a first tension level in a conveyor belt of a conveyor assembly; comparing the tension level to a desired tension level in the conveyor belt of the conveyor assembly; in response to the first tension level not corresponding to the desired tension level in the conveyor belt of the conveyor assembly, determining one of a slip condition of the conveyor belt and a stall condition of the conveyor belt; and determining a second tension level of the conveyor belt based on the first tension level of the conveyor belt and the one of the slip condition of the conveyor belt and the stall condition of the conveyor belt.

Another example aspect of the present disclosure is directed to a computer-implemented method that may include determining a first tension level of a conveyor belt of a conveyor assembly; determining one of a slip condition of the conveyor belt and a stall condition of the conveyor belt; and determining a second tension level of the conveyor belt based on the detected first tension level of the conveyor belt and the one of the slip condition of the conveyor belt and the stall condition of the conveyor belt.

The various aspects may include one or more of the following features. The programming instructions may further include programming instructions to instruct the one or more processors to generate a control signal configured to cause a controllable subsystem to alter a tension level in the conveyor belt based on the adjustment to the tension level. The adjustment to the tension level may be an increase to the tension level in the conveyor belt in response to the tension level being less than the desired tension level and the detected one of the slip condition of the conveyor belt and the stall condition of the conveyor belt being a slip condition of the conveyor belt. The adjustment to the tension level may be a decrease to the tension level in the conveyor belt in response to the tension level being greater than the desired tension level and the detected one of the slip condition of the conveyor belt and the stall condition of the conveyor belt being a stall condition of the conveyor belt. The conveyor assembly may include the conveyor belt; a motive device; a drive roller coupled to the motive device; and an idler roller. The motive device may be configured to rotate the drive roller. The conveyor belt may be engaged with the drive roller and the idler roller, and the conveyor belt may be moveable in response to rotation of the drive roller. The idler roller may be configured to be rotated in response to movement of the belt. The programming instructions that instruct the one or more processors to determine one of the slip condition of the conveyor and the stall condition of the conveyor belt may include programming instructions that instruct the one or more processors to determine the stall condition of the conveyor belt in response to detection of one of a torque of the motive device being greater than a selected torque value, a rotational speed of the motive device being less than a selected rotational speed, and an electrical current being greater than a selected electrical current. A controllable subsystem may be included, and the controllable subsystem may include one of a hydraulic controllable subsystem and an electrical controllable subsystem. The conveyor assembly may include the conveyor belt; a motive device; a driver roller coupled to the motive device; and an idler roller. The motive device may be configured to rotate the driver roller. The conveyor belt may be engaged with the drive roller and the idler roller, and the conveyor belt may be moveable in response to rotation of the drive roller. The idler roller may be configured to be rotated in response to movement of the belt. The programming instructions that instruct the one or more processors to determine one of the slip condition of the conveyor and the stall condition of the conveyor belt may include programming instructions that instruct the one or more processors to determine the slip condition of the conveyor belt in response to detection of a difference between a rotational speed of the idler roller and a rotational speed of the driver roller. A sensor may be included, and the programming instructions that instruct the one or more processors to determine the tension level of the conveyor belt of the conveyor assembly may include programming instructions that instruct the one or more processors to receive, from the sensor, a signal indicative of the tension level of the conveyor belt of the conveyor assembly. A conveyor assembly may include the conveyor belt, a roller on which the conveyor belt moves, and a tensioner configured to impart a force to the roller. The sensor may be configured to sense a load in the tensioner. The load in the tensioner may be indicative of tension of the conveyor belt of the conveyor assembly.

The various aspects may include one or more of the following features. A control signal may be generated to cause a controllable subsystem to change the first tension level in the conveyor belt to be the second tension level. The control signal may be configured to cause the controllable subsystem to increase tension in the conveyor belt in response to the first tension level being less than the desired tension level and the detected one of the slip condition of the conveyor belt and the stall condition of the conveyor belt being a slip condition of the conveyor belt. An actuator of the controllable subsystem may be actuated in response to the generated control signal to increase alter a load applied to a roller of conveyor assembly to cause the first tension level to increase to the second tension level. The control signal may be configured to cause the controllable subsystem to decrease tension in the conveyor belt in response to the first tension level being greater than the desired tension level and the detected one of the slip condition of the conveyor belt and the stall condition of the conveyor belt being a stall condition of the conveyor belt. An actuator of the controllable subsystem may be actuated, in response to the generated control signal, to alter a load applied to a roller of conveyor assembly to cause the first tension level to decrease to the second tension level. Determining one of the slip condition of the conveyor and the stall condition of the conveyor belt may include determining the slip condition of the conveyor belt in response to detection of a difference between a rotational speed of an idler roller of the conveyor assembly and a rotational speed of a driver roller of the conveyor assembly. Sensing the tension condition of the conveyor belt of the conveyor assembly may include sensing, with the sensor, a load in a tensioner of the conveyor assembly. The sensed load may be indicative of the tension in the conveyor belt.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

Figure 1:
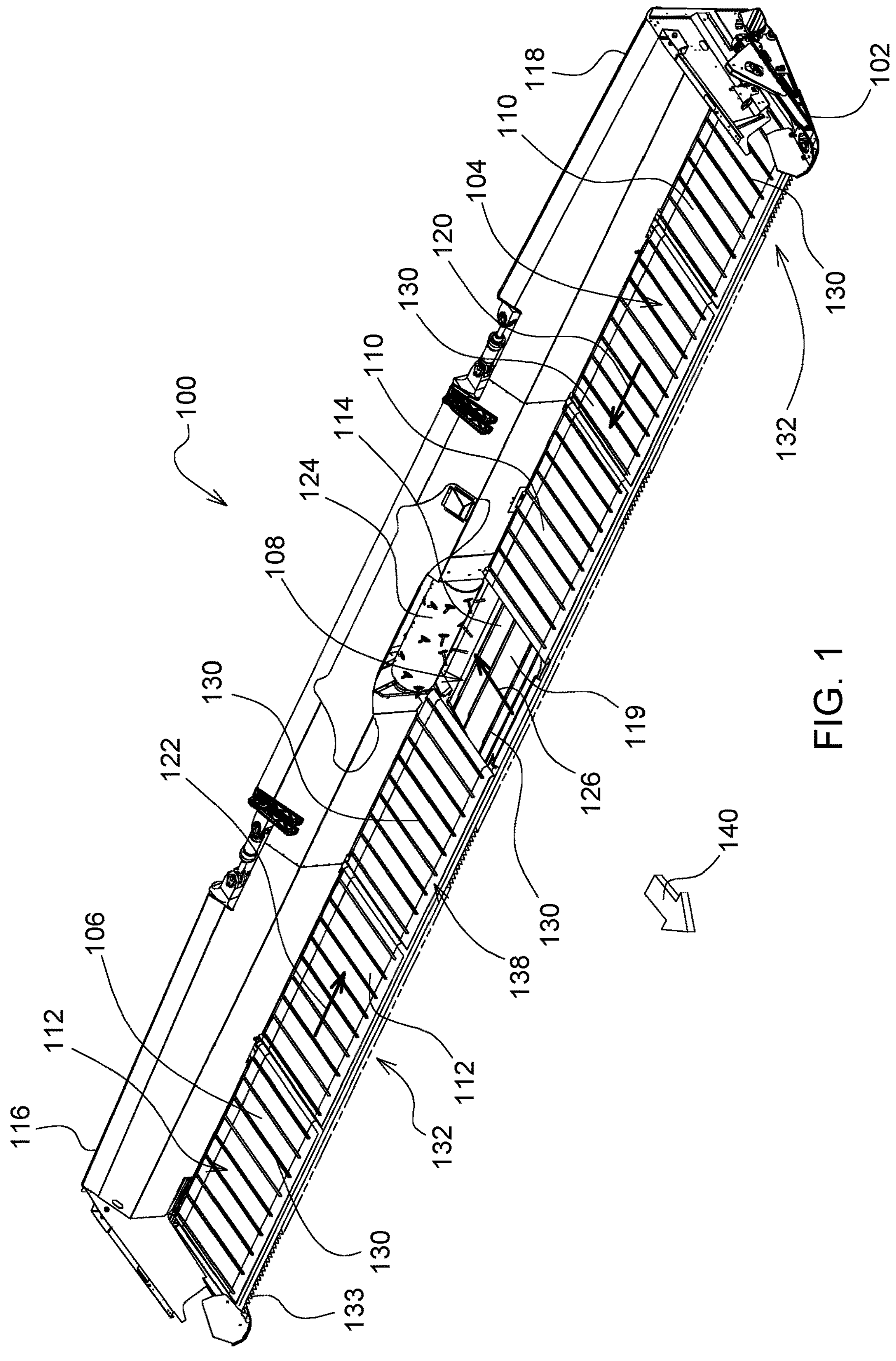
FIG. 1 is a perspective view of an example draper header, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to harvester headers and, particularly, to draper headers that include automatic belt tension adjustment systems. In some implementations, the belt tension adjustment systems are operable to detect one or more operating conditions of a conveyor assembly of the header, determine a tension status of an endless belt of the conveyor assembly, and automatically implement an action to adjust a tension in the endless belt.

Words of orientation, such as “up,” “down,” “top,” “bottom,” “above,” “below,” “leading,” “trailing,” “front,” “back,” “forward,” and “rearward” are used in the context of the illustrated examples as would be understood by one skilled in the art and are not intended to be limiting to the disclosure. For example, for a particular type of vehicle in a conventional configuration and orientation, one skilled in the art would understand these terms as the terms apply to the particular vehicle. Alternately, for a particular machine or a particular component of the machine, one skilled in the art would understand these terms as the terms apply to the particular machine or component of the machine in the normal use thereof.

For example, as used herein, with respect to an endless belt, unless otherwise defined or limited, the term “forward” (and the like) corresponds to a forward direction of travel of the belt, with respect to a supporting frame (e.g., a frame of a draper header), during normal operation of the belt. Likewise, the term “rearward” (and the like) corresponds to a direction opposite the forward direction of travel of the belt. In this regard, for example, a "forward facing" feature on an endless belt may generally face in the direction that the belt travels during normal operation, while a "rearward facing" feature may generally face opposite that direction.

Also as used herein, with respect to a header (or components thereof), unless otherwise defined or limited, the term "leading" (and the like) indicates a direction of travel of the header during normal operation (e.g., the forward direction of travel of a harvester vehicle carrying a header). Similarly, the term "trailing" (and the like) indicates a direction that is opposite the leading direction. In this regard, for example, a "leading" edge of a knife assembly of a draper header may be generally disposed at the front of the knife assembly, with respect to the direction travel of the draper header during normal operation (e.g., as carried by a harvester vehicle). Likewise, a "trailing" edge of the knife assembly may be generally disposed at the back or a side of the knife assembly opposite the leading edge, with respect to the direction of travel of the draper header during normal operation.

FIG. 1 shows an example draper header 100 that includes a frame 102 that supports a first side conveyor assembly 104 and a second side conveyor assembly 106 and a center conveyor assembly 108. Each of the conveyor assemblies 104, 106, and 108 is configured as a belt-type conveyor extending over a respective circumferential length. The conveyor assemblies 104, 106, and 108 include endless belts 110, 112, and 114 that are moved in respective loops along the header 100 by motive devices, such as motors (e.g., hydraulic motors and electric motors), gears, or internal belts. The conveyor assemblies 104 and 106 are disposed on opposing wings 116 and 118, respectively, of the header 100. In some implementations, the wings 116 and 118 are pivotable relative to center portion 119 of the draper header 100. In other implementations, the wings 116 and 118 are not pivotable relative to the center portion 119. In the illustrated example, the conveyor assembly 104 includes two endless belts 110, and the conveyor assembly 106 and two endless belts 112. In other implementations, the conveyor assemblies 104 and 106 may include additional or fewer endless belts. Further, although the conveyor 108 is shown as including a single endless belt 114, in other implementations, the conveyor assembly 108 may include additional endless belts. The endless belts 110, 112, and 114 are supported on two or more rollers of the respective conveyor assemblies 104, 106, and 108.

Generally, the endless belts 110 and 112 may be rotated such that upper surfaces of the endless belts 110 and 112 move inward along the header 100 in respective directions 120 and 122. In this way, material, such as cut plant matter, may be moved by the endless belts 110 and 112 to the center conveyor 108, which may, in turn, use the endless belt 114 to move the material off of the header 100. For example, the header 100 may offload the material onto a harvester vehicle to which the header 100 is attached. The header 100 also includes a cylindrical conveyor 124. The cylindrical conveyor 124 receives cut crop material from the center conveyor 108 and advances the crop material rearward (i.e., in a direction 126) through an aperture in the frame 102 located between the cylindrical conveyor 124 and the center conveyor 108 and, ultimately, into the harvester vehicle. In some implementations, the header 100 may include a reel rotatable mounted on arms to engage crop and urge the crop towards the endless belts 110, 112, and 114.

In the illustrated example, various cleats 130 are fixed to the surface of each of the endless belts 110, 112, and 114, with the cleats 130 generally extending in a direction transverse to the direction of travel of the respective endless belt 110, 112, or 114, e.g., directions 120, 122, and 126. In some implementations, the cleat 130 may extend less than an entire width of the endless belts 110, 112, and 114. For example, one or more of the cleats 130 may extend only partially across the respective width of the endless belts 110, 112, and 114, and, accordingly, may not extend to a leading edge or a trailing edge of the belts 110, 112, and 114. In some implementations, the cleats 130 on one or more of the endless belts 110, 112, and 114 are omitted.

The header 100 also includes a knife 132 at a leading edge 133 of the header 100. In some implementations, the knife 132 may be a reciprocating knife. The knife 132 cuts crop material, such as to sever crop material from a field. The knife 132 extends laterally along the header 100.

During a harvesting operation, a harvester vehicle may carry the header 100 through an agricultural field in a forward direction 140. As the header 100 is moved across the field, the knife 132 operates to sever the crops, such as at a location adjacent to the ground. The severed crop material generally falls in a trailing direction (i.e., generally opposite the direction 140), onto one or more of the three conveyor assemblies 104, 106, and 108. The conveyor assembly 104 on the wing 118 carries the crop material in the direction 120, using the endless belts 110, toward the center conveyor assembly 108. The conveyor assembly 106 carries the severed crop material in the direction 122, using the endless belts 112, toward the center conveyor assembly 108, and the center conveyor assembly 108 carries the severed crop material in the direction 126 towards and underneath the cylindrical conveyor 124. The severed crop material from the cylindrical conveyor 124 is transported in the direction 126 through the aperture in the frame 102 of the header 100 and into the agricultural harvester.

In the illustrated example, the conveyor assembly 104 and the conveyor assembly 106 are similarly configured, although the conveyor assemblies 104 and 106 may carry crop material in opposite directions 120 and 122, respectively. In other implementations, the conveyor assemblies 104 and 106 may be configured differently. Generally, however, the description herein of the conveyor assembly 104 may be applicable to the conveyor assembly 106, as well as other conveyor assemblies of other implementations.

Figure 2:
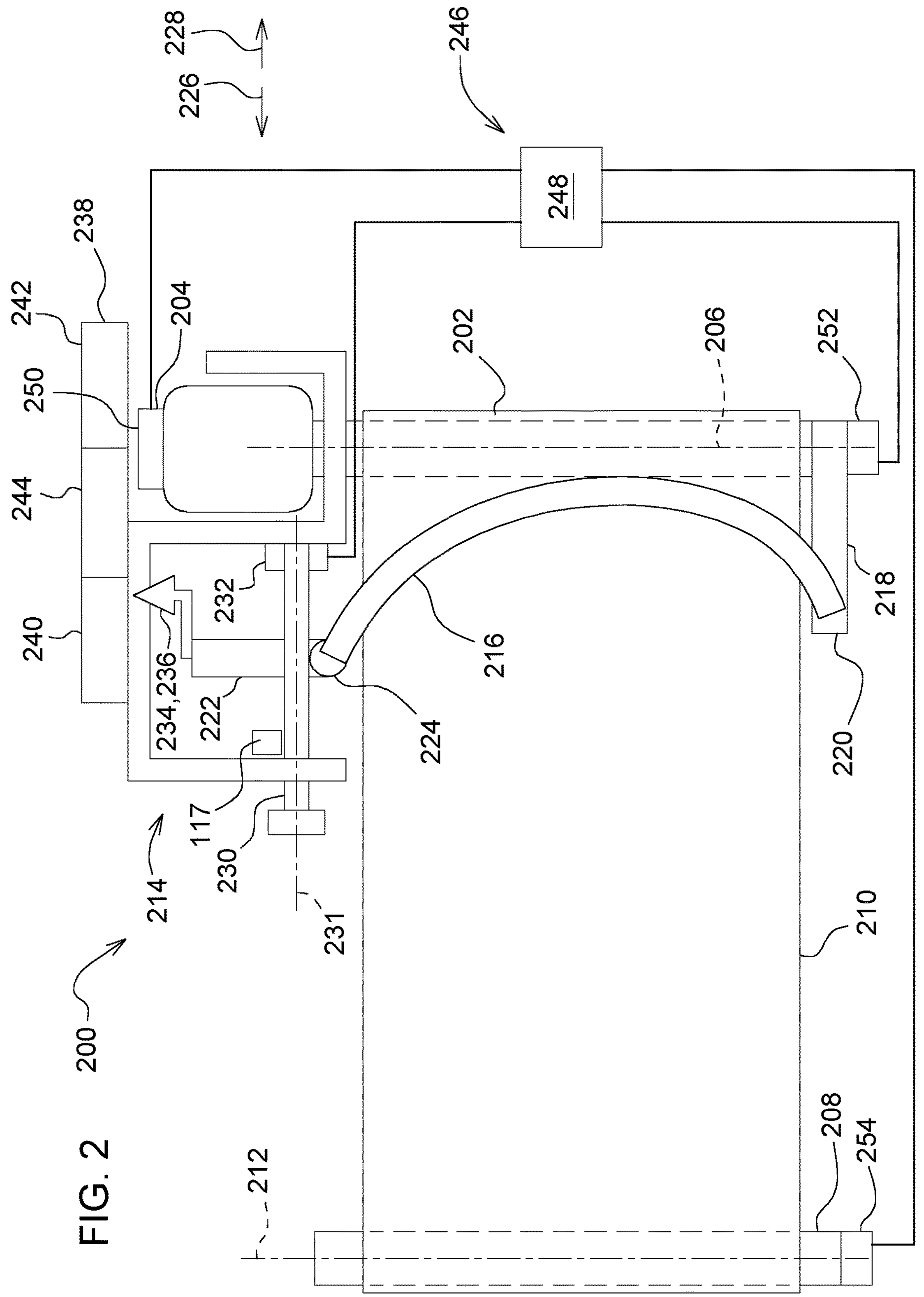
FIG. 2 is a diagrammatic view of an example conveyor assembly that includes a schematic of an example control system, according to some implementations of the present disclosure.

FIG. 2 is a diagrammatic view of an example conveyor assembly 200, which may be similar to the one or more of the conveyor assemblies 104, 106, and 108. In the illustrated example, the conveyor assembly 200 includes a driver roller 202 coupled to a motive device 204. The motive device 204 is operable to rotate the driver roller 202 about a rotational axis 206. Example motive devices 204 include motors, such as hydraulic motors or an electric motors. However, other types of devices configured to rotate the driver roller 202 are within the scope of the present disclosure. Further, although the motive device 204 is shown directly attached to the driver roller 202, in other implementations, the motive device 204 may be coupled to the driver roller 202 through an intermediary, such as one or more belts or gears.

The conveyor assembly 200 also includes an idler roller 208 and an endless belt 210 that is carried by the driver roller 202 and the idler roller 208. The endless belt 210 encircles and engages the driver roller 202 and the idler roller 208. The rotation of the driver roller 202 about the rotational axis 206 imparted by the motive device 204 causes motion of the endless belt 210. The motion of the endless belt 210 is transmitted to the idler roller 208, causing the idler roller 208 to rotate about rotational axis 212.

The conveyor assembly 200 also includes a belt tensioner 214. In the illustrated example, the belt tensioner 214 includes a spring 216 that is mounted to a bracket 218 at a first end 220 and movable carriage 222 at a second end 224. In some implementations, the spring 216 is pivotably mounted at the first end 220, the second end 224, or both. The carriage 222 is selectively movable in the directions of arrows 226 and 228. In the illustrated example, the carriage 222 is movable on and in response to rotation of a threaded shaft 230. The threaded shaft 230 may be rotated by a motor (such as an electrical motor or hydraulic motor) or in other ways, such as via belts or gears. In other implementations, the carriage 222 is movable in response to an actuator, such as a linear actuator, e.g., an electrical linear actuator or a hydraulic linear actuator, or a rotary actuator. The carriage 222 and the threaded shaft 230 include mating threads such that, as the threaded shaft 230 is rotated in a first rotational direction about rotational axis 231, the carriage moves in the direction of arrow 226 as a result of the engagement between the mating threads. Rotation of the threaded shaft 230 in a second rotational direction, opposite the first rotational direction, causes the carriage 222 to move in the direction of arrow 228 as a result of engagement between the mating threads.

In the illustrated example, the spring 216 engages the driver roller 202, imparting a force thereto that operates to separate the driver roller 202 from the idler roller 208 laterally. That is, as the carriage 222 is moved in the direction of arrow 228, the spring 216 imparts a greater force to the driver roller 202, causing the driver roller 202 to move in the direction of arrow 228, further separating the driver roller 202 from the idler roller 208. Increasing the separation distance between the driver roller 202 and the idler roller 208 increases a tension in the endless belt 210, whereas decreasing the separation distance between the driver roller 202 and the idler roller 208 decreases a tension in the endless belt 210.

Although the spring 216 is engaged with the driver roller 202 in the illustrated example, in other implementations, the tensioner 214 acts upon the idler roller 208 such that the spring 216 engages the idler roller 208 to alter a distance separating the idler roller 208 relative to the driver roller 202 and, hence, alter an amount of tension in the endless belt 210. In still other implementations, the tensioner 214 may be operable to engage and displace both the driver roller 202 and the idler roller 208 to alter a distance therebetween and, hence, alter a tension in the endless belt 210. In some implementations, the spring 216 is replaced with another component that is configured to engage the driver roller 202 to alter a separation between the idler roller 208 and the driver roller 202 and, hence, alter a tension in the endless belt 210.

In some implementations, the conveyor assembly 200 includes a sensor 217 that senses a load or stress in a component of the tensioner 214 or another part of the conveyor assembly. The sensed load or stress is one indicative of a tension in the endless belt 210. Example sensors 217 include sensors that sense a stress in the spring 216, a stress in the threaded shaft 230, or a stress in the driver roller 202, the idler roller 208, or both. Although the sensor 217 is located adjacent to the threaded shaft 230, in other implementations, the sensor 217 may be located at a different location on the conveyor assembly 200. In still other implementations, the conveyor assembly 200 may include multiple sensors 217 to sense a load or stress in multiple components of the conveyor assembly 200. Example sensors 217 include strain gauges (e.g., a Wheatstone Bridge) or load cells.

The conveyor assembly 200 also includes a position sensor 232 that is operable to detect an amount of separation between the driver roller 202 and the idler roller 208. Position sensors 232 include, for example, linear position sensor, rotary position sensor, optical sensors, electrical sensor, ultrasonic transducers, hall effect sensors, capacitive sensors, potentiometers, magnetostriction sensors, incremental encoders, laser sensors, as well as other types of position sensors operable to detect a displacement of the driver roller 202 or the idler roller 208 relative to each other or relative to a selected location or a distance or change in distance between the driver roller 202 and the idler roller 208. In some implementations, the position sensor 232 is configured to detect an amount of rotation of the threaded shaft 230. The amount of rotation of the threaded shaft 230 can be converted into an amount of movement of the carrier 222, the driver roller 202, the idler roller 208, or another component and, consequently, an amount of tension in the endless belt 210. Although the position sensor 232 is located adjacent to the threaded shaft 230, in other implementations, the position sensor 232 can be positioned in other locations so as to detect a position of the carrier 222, driver roller 220, idler roller 208 or another component whose position or displacement can be used to determine or as an indication of tension in the endless belt 210.

The conveyor assembly 200 also includes a tension indicator 234 that provides an indication of a position of carriage (such as a visual indication) and, hence, an indication of a distance existing between the driver roller 202 and the idler roller 208. In some instances, the tension indicator 234 is a visual, analog indicator and may form part of the position sensor 232. In other implementations, the tension indicator 234 is an electronic sensor configured to sense a tension, either directly or indirectly, in the endless belt 210. Thus, in some instances, output from the position sensor 232 is indicative of tension in the endless belt 210, since tension in the endless belt 210 varies based on a separation distance between driver roller 202 and the idler roller 208. In some implementations, the position sensor 232 and the tension indicator 234 may serve a similar function, such as to detect a tension level in the endless belt 210. Thus, in some implementations, one of the position sensor 232 or the tension indicator 234 may be omitted.

In the illustrated example, the tension indicator 234 includes a pointer 236 and a meter 238. The pointer 236 moves with the carriage 222 relative to the meter 238, providing an indication of a position of the driver roller 202 relative to the idler roller 208 and, thus, an indication of an amount of tension in the endless belt 210. In the illustrated example, the meter 238 includes a first range 240, a second range 242, and a third range 244 disposed between the first range 240 and the second range 242. The third range 244 may indicate a desirable amount of tension in the endless belt 210. The first range 240 may indicate a condition in which the amount of tension in the endless belt 210 is less than a desired tension level, and the second range 242 may indicate a condition in which the amount of tension in the endless belt 210 is greater than a desired tension level. Output from the position sensor 232 may be used to provide similar indications regarding the tension of the endless belt 210.

In other implementations, the tension indicator 234 is an electronic indicator. For example, in some implementations, the tension indicator 234 may sense an amount of movement of the driver roller 202 relative to a selected datum. In some implementations, the datum may be a selected value or a range of values. The tension indicator 234 may display the sensed amount of movement, e.g., a scalar value with units, or the tension indicator 234 may indicate whether the amount of sensed movement is determined to be an acceptable amount. For example, the tension indicator 234 may display the amount of sensed movement with a particular color that is coded to correspond to whether the sensed amount of movement is acceptable or not. In some implementations, the tension indicator 234 may include a display that displays the sensed amount of movement, a desirability of the sensed amount of movement, or both, or some other indication corresponding to the sensed amount of movement and, hence, tension in an endless belt.

A control system 246 is used to control tension in the endless belt 210 automatically. The control system 246 includes an electronic controller 248. In some implementations, the electronic controller 248 is computer system, such as computer system 900 described in more detail below.

The controller 248 is communicably connected to a torque sensor 250 coupled to the motive device 204. The torque sensor 250 senses a torque exerted by the motive device 204. In some implementations, the controller 248 may be directly connected to the motive device 204 to detect, for example, the electrical current being drawn by the motive device 204, where the motive device 204 is an electric motor. The electrical current can be used to determine a power, torque, or both of the motive device 204. In some implementations, the motive device 204 is a hydraulic motor, and the torque sensor 250 senses hydraulic pressure being delivered to the hydraulic motor. The torque sensor 250 senses the hydraulic pressure, and that sensed hydraulic pressure can be used to determine torque being output by the hydraulic motor. In some implementations, in addition to or in place of the torque sensor 250 to detect torque of the motive device 204, the controller 248 may sense an electrical current being drawing by the motive device 204. The sensed torque, the sensed electrical current, or both may be used to detect a stall condition of the motive device 204.

Rotational speeds sensors 252 and 254 are also in communication with the controller 248. The rotational speed sensors 252 and 254 sense a rotational speed of the driver roller 202 and the idler roller 208, respectively. The controller 248 is also in communication with the position sensor 232. As mentioned above, the output of the position sensor 232 is indicative and can be used as a prosy for tension in the endless belt 210. In some instances, other sensors or devices may be connected to the controller 248. For example, in some instances, the controller 248 is in communication with the tension indicator 234, which can provide tension information or information used as a proxy of or to determine tension in the endless belt 210. Each of the different sensors 250, 254, 252, 232, and 234 can be connected to the controller 248 via a wired or wireless connection.

Figure 3:
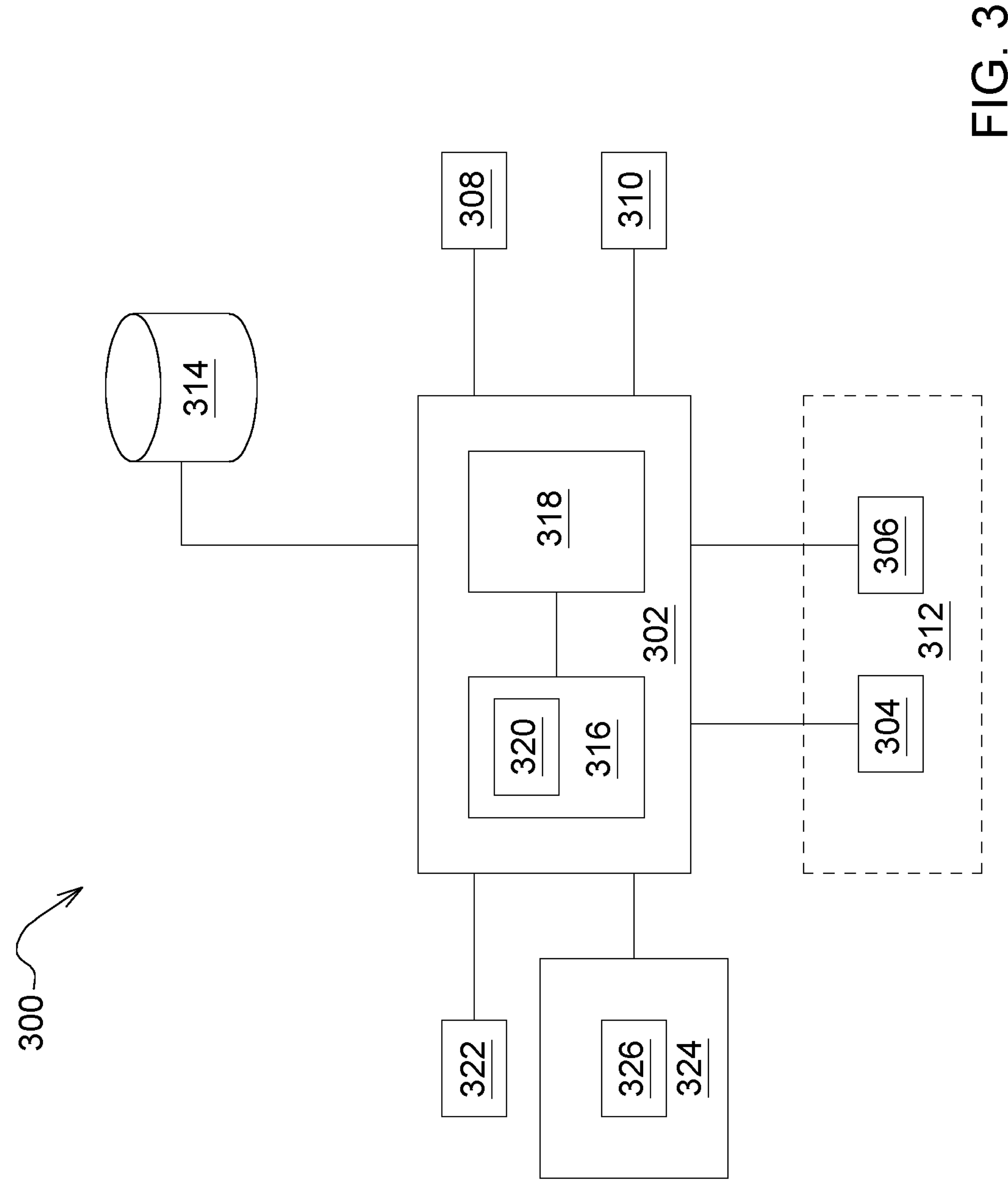
FIG. 3 is a schematic of an example control system, according to some implementations of the present disclosure.

FIG. 3 is a schematic view of an example control system 300 similar to the control system 246. The control system 300 is operable to adjust automatically a tension in an endless belt of a conveyor system, which may be similar to conveyor system 200. The control system 300 includes a controller 302, which may be similar to controller 248; rotational speed sensors 304 and 306, which may be similar to rotational speed sensors 252 and 254; a torque sensor 308, which may be similar to torque sensor 250; and a position sensor 310, which may be similar to position sensor 232. In some implementations, the control system 300 also includes a tension indicator, similar to the tension indicator 234, described earlier. In some implementations, the rotational speed sensors 304 and 306 may form part of a belt protection system 312 that operates to sense a difference in rotational speeds between a driver roller and an idler roller. Although torque sensor 308 is describe, in other implementations, the torque sensor 308 may be replaced with, or used in combination with, a hydraulic pressure sensor, a speed sensor, or an electrical current sensor. For example, output from such a hydraulic pressure sensor, a speed sensor, or an electrical current sensor can be used to determine torque being exerted by the motive device. In some instances, a belt tension sensor may replace or be used in combination with the position sensor 310. The system 300 may also include or be communicably coupled to a remote database 314, which may be in the form of cloud storage, a remote server, or some other type of electronic storage configured to store information. The various components of the control system 300 are communicably coupled to the controller 302, such as via a wired or wireless connection.

In some implementations, the controller 302 is a computer system, such as computer system 900 described in more detail below. The controller 302 includes a processor 316 communicably coupled to a memory 318. Additional details of the controller 302, such as details regarding the processor 322 and memory 324, are described below in the context of computer system 900. The memory 318 communicates with the processor 316 and is used to store programs and other software, information, and data. The processor 316 is operable to execute programs and software and receive information from and send information to the memory 318, the remote database 314, or both. Although a single memory 318 and a single processor 316 are illustrated, in other implementations, a plurality of memories, processors, or both may be used. Although the processor 316 and the memory 318 are shown as being local components of the controller 302, in other implementations, one or both of the processor 316 and memory 318 may be located remotely. Software 320, such as in the form of an application or program, is executed by the processor 316 to control operation of the control system 300, as described in more detail below. Particularly, the software 320 includes executable instructions operable, for example, to detect or determine a tension status of an endless belt and automatically adjust the tension of the endless belt in response to input received from one or more of the sensors 304, 306, 308, and 310.

The control system 300 also includes a user input device 322 and a display 324. The user input device 322 is communicably coupled to the controller 302 via a wired or wireless connection. Example input devices 322 include a keyboard, keypad, one or more buttons, a slider bar, a dial, a knob, a mouse, or a joystick. The display 324 is communicably coupled to the controller 302 via a wired or wireless connection. The display 324 displays information, such as information related to the operation of control system 300. For example, information displayed by the display 324 may include one or more of a rotational speed of an idler roller or a driver roller, a belt tension or information indicative of or related to belt tension, a torque level, power level, or operational speed of a motive device that rotates the driver roller of a conveyor assembly. In some instances, the information displayed by the display 324 is displayed via a graphical user interface (GUI) 326. Example displays 324 include cathode ray tubes (CRT), liquid crystal displays (LCDs), or plasma displays. Other types of displays are also within the scope of the present disclosure. In some implementations, the display 324 is a touch screen that is operable to receive input from a user via a user's touch. In some implementations in which the display 324 is a touch screen, the input device 322 may be omitted.

Figure 4:
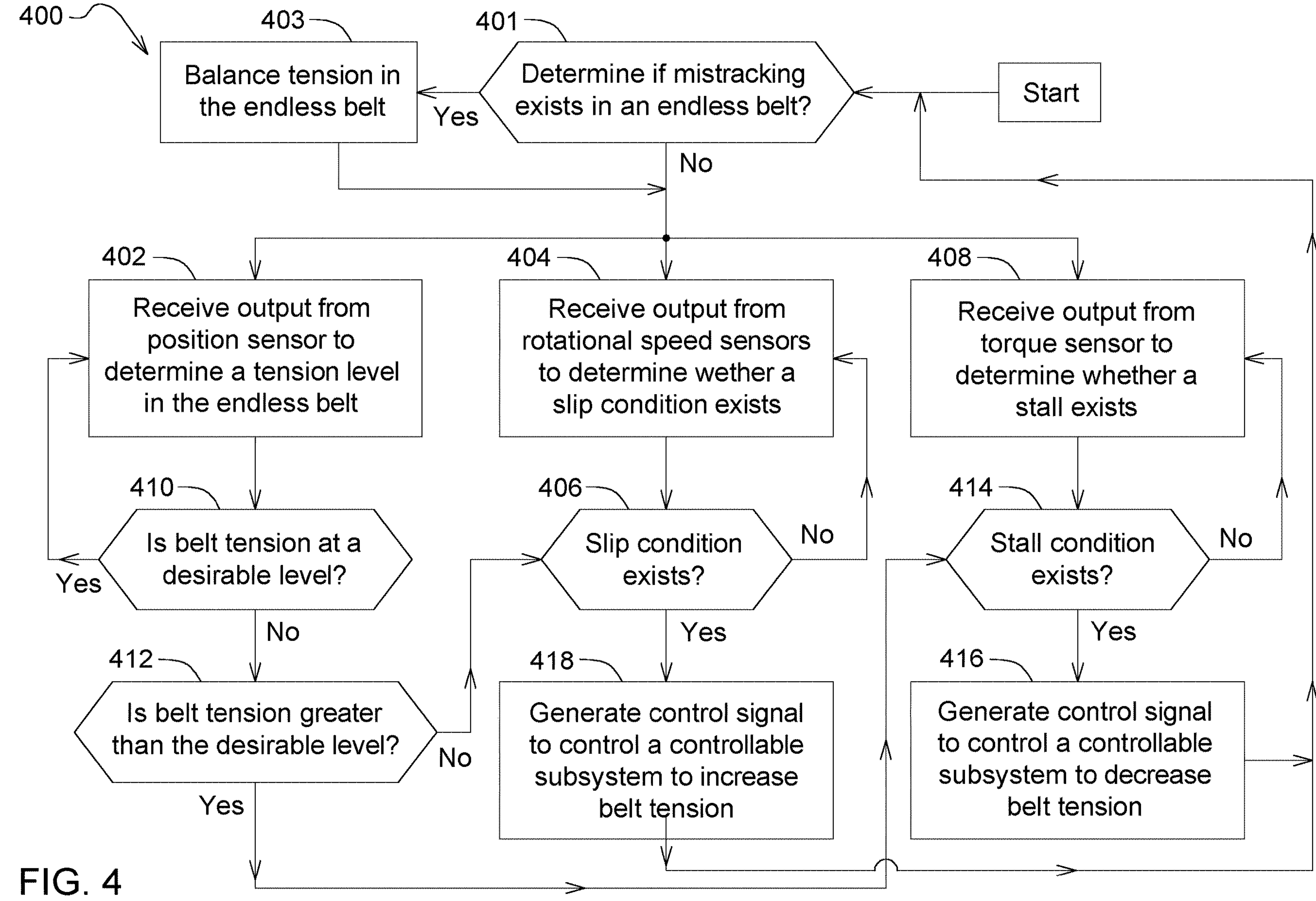
FIG. 4 is a flowchart of an example method for automatically controlling tension of an endless belt, according to some implementations of the present disclosure.

FIG. 4 shows an example method 400 for automatically detecting a tension condition in an endless belt and automatically generating control signals operable to cause a tension level in the endless belt to be adjusted. The method 400 is described in the context of the example control system 300. However, the scope of the description is not limited to the control system 300. Rather, the concepts contemplated by the example method 400 encompasses other control systems within the scope of the present disclosure.

At 401, a determination is made as to whether mistracking of endless belt exists. As explained below, mistracking occurs when an imbalance in tension exists in an endless belt. An imbalance in tension between opposite sides of an endless belt (e.g., sides 1106 and 1180 of endless belt 1102, shown below in FIG. 11) occurs when tension in one side of the endless belt is greater than the tension in the other side of the endless belt. An imbalance in tension can be detected using sensors (e.g., pressure transducers or other sensors operable to detect tension in an endless belt and, particularly, in a side of an endless belt). If mistracking exists, the method 400 moves to 403 where tension in the sides of the endless belt are balanced. As explained below, balancing tension in the sides of an endless belt may be accomplished by one of increasing a tension in a side of the endless belt, reducing tension in a side of the endless belt, or increasing tension in one side of the endless belt while decreasing tension in the other side of the endless belt. Altering a tension in a side of an endless belt can include, for example, increasing or decreasing a distance between roller of a conveyor assembly at a side of the endless belt. For example, a hydraulic actuator coupled to one of the rollers of the conveyor assembly may be used to move the roller, thereby altering a tension in the side of the endless belt. Balancing tension in the sides of an endless belt is describe din more detail below. With mistracking corrected (i.e., with tension in the sides of the endless belt balanced), the method moves to 402, 404, and 408.

At 402, an output from a position sensor, such as position sensor 310 or 232, that is indicative of a tension level in an endless belt is received by, for example, a controller of a control system. In some implementations, a tension level may be received from a tension sensor, such as tension sensor 234 described earlier. For example, in some instances, a desired tension in an endless belt, such any of the endless belts described herein, may be within a range of 400 pound-feet (lb.-ft.) (542.3 Newton-meters (Nm)) to 500 lb.-ft. (678.0 Nm). Other tension ranges are also within the scope of the present disclosure.

In some implementations, tension in an endless belt may be determined with a position sensor that detects or is used to determine a separation distance between components of a conveyor assembly whose relative movement is indicative of a tension level in the endless belt. Examples of these separations distances and the associated components is described in mor detail below. Tension in the endless belt may also be represented by a force experienced by or stress in a component in the conveyor assembly.

For example, a force experienced by a belt tensioner that is used to maintain a tension in the endless belt may be used to represent a tension level in the endless belt. Where the belt tensioner includes a hydraulic actuator (e.g., a hydraulic linear actuator), a hydraulic pressure of the hydraulic actuator may be indicative of and used to determine a tension in the endless belt. For example, the hydraulic pressure in the actuators 520 and 608 (described in greater detail below) may be used to determine the tension in the endless belts 517 and 622, respectively. In some instances, a pressure transducer is used to detect the hydraulic pressure in the hydraulic actuator.

Figure 5:
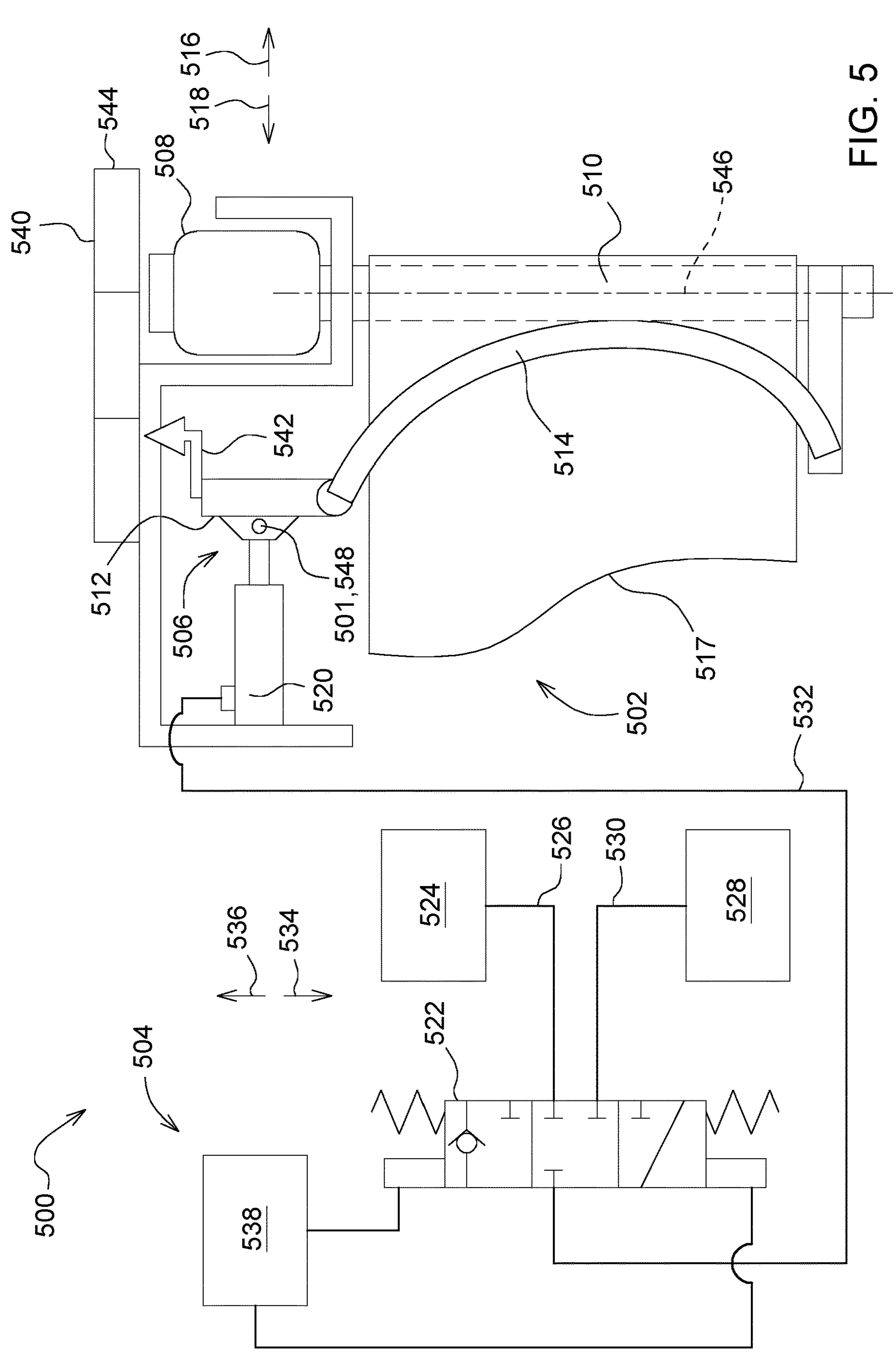
FIG. 5 is a partial schematic, partial diagrammatic view of a portion of an example belt tension control system, according to some implementations of the present disclosure.

In other instances, stress in a component of a conveyor assembly may be used to represent the tension in the endless belt of the conveyor assembly. For example, stress in the spring used to apply a force to a driver roller (such as the springs 216 and 514) may be representative of a tension in the endless belt. Tension in the spring may be detected using one or more strain gauges fitted to the spring. In another example, a gauged shear pin that is used to connect an actuator (such as actuator 520 or 608 discussed below) may be used. In some instances, the gauged shear pin may be used to connect the actuator to a carriage (e.g., carriage 512, also discussed below) or a frame of the conveyor assembly. Referring to FIG. 5, gauged shear pin 501 is used to connect the actuator 520 to carriage 512. The force sensed by the gauged shear pin can be used to represent a tension in the endless belt. Other components of the conveyor assembly that experiences a change in load or stress as a tension in the endless belt changes may also be used to provide information that is indicative of a tension level in the endless belt. Further, other types of sensors may also be used.

At 404, an output from rotational speed sensors operable to sense a rotational speed of rollers of a conveyor assembly is received by the controller. For example, an output is received from a first rotational speed sensor (such as rotational speed sensor 304) that senses a rotational speed of a driver roller of the conveyor assembly, and output is received from a second rotational speed sensor (such as rotational speed sensor 306) that senses a rotational speed of an idler roller of the conveyor assembly. At 406, a determination is made as to whether a slip condition exists by comparing the rotational speeds from the driver roller and the idler roller. If a difference exists between the two rotational speeds exits, then a slip condition exits. At 408, an output from a torque sensor, such as torque sensor 308 is received by the controller. The torque sensor senses a torque of a motive device, such as motive device 204, that is operable to rotate the driver roller of the conveyor assembly. In some implementations, an electrical current drawn by a motive device used to operate a driver roller is received by the controller. As explained above, an electrical current can be used to determine a torque being exerted by the motive device.

At 410, the output from the position sensor is used to determine whether the tension in the endless belt is at a selected level or within a selected range corresponding to a desirable tension level in the endless belt. If the tension within the endless belt is within at a desirable level, then the method 400 returns to 402, and output from the position sensor continues to be received, and the tension in the endless belt continues to be evaluated at 410. If the tension level is determined not to be at a desirable level or within a desirable range, then the method 400 moves to 412 where a determination is made as to whether the tension level in the endless belt is greater than the desirable level. If the tension level is determined to be greater than the desirable level, the method 400 moves to 414 where a determination is made as to whether a stall condition exits. The output from the torque sensor is used to determine whether a stall condition exits, and, if so, a control signal is generated at 416. For example, in some implementations, a stall is detected when a sensed torque value of the motive device exceeds a selected torque value. In some implementations, a stall is detected when an electrical current drawn by the motive device exceeds a selected electrical current value. The control signal generated at 416 is configured to control a controllable subsystem to decrease tension in the endless belt. In some implementations, the control signal is transmitted to the controllable subsystem, and the tension level in the endless belt is decreased. In some implementations, from 416, the method returns to the start of method 400 so that the belt tension continues to be monitored and adjusted as described. If the stall condition is determined not to exist, then the method 400 returns to 408, and no alteration to the belt tension is performed.

Alternatively, if the tension level in the endless belt is determined not to be greater than the desirable limit (i.e., the tension level in the endless belt is determined to be less than the desirable level), then the method moves to 406. At 406, if a slip condition is determined to exist and the tension level in the endless belt is less than the desirable tension level, then the method 400 moves to 418 where a control signal is generated to control a controllable subsystem to increase tension in the endless belt. In some implementations, the control signal is transmitted to the controllable subsystem, and the tension level in the endless belt is increased. In some implementations, from 418, the method returns to the start of method 400 so that the belt tension continues to be monitored and adjusted as described. If the slip condition is determined not to exist, then the method 400 returns to 404, and no alteration to the belt tension is performed. In some implementations, the controllable subsystem that is controllable to increase belt tension is the same controllable subsystem that is controllable to decrease belt tension is the same controllable subsystem. In some implementations, the controllable subsystems are different.

In some implementations, at 406, if a slip condition is determined to exist and if a tension level is determined to be below the desirable level, then a determination as to whether a stall condition exists prior to generating the control signal to cause the controllable subsystem to increase the belt tension. If a stall condition is determined not to exist, then the control signal is generated. In some implementations, at 414, if a stall is determined to exist and if the belt tension is determined to be less than the desirable level, then a determination is made as to whether a slip condition exists prior to generating the control signal to cause the controllable subsystem to decrease the belt tension. If the slip condition is determined not to exits, then the control signal is generated.

FIGS. 5-8 describe various control arrangements that are operable to alter a tension in an endless belt of a conveyor assembly. FIG. 5 is a partial schematic, partial diagrammatic view of a portion of belt tension control system 500 that includes a conveyor assembly 502, which may be similar to the conveyor assembly 200, and a control system 504 that may be similar to control system 300. The conveyor assembly 502 includes a tensioner 506, which may be similar to tensioner 214; a motive device 508, which may be similar to motive device 204; and a driver roller 510 coupled to the motive device. The driver roller 510 may be similar to the driver roller 202.

The tensioner 506 includes a carriage 512, which may be similar to carriage 222, that is used to adjust a force applied to the driver roller 510. In the illustrated example, the carriage 512 applies a force to the driver roller 510 with a spring 514, which may be similar to spring 216, in a manner similar to that described earlier. As explained above, application of a force to the driver roller 510 via the spring 514 operates to displace the driver roller 510 in the direction of arrow 516, thereby increasing a tension in an endless belt 517 being driven by the driver roller 510. In other implementations, the spring 514 may be replaced with another structure to apply a force to the driver roller 510. Further, as explained above, the spring 514 (or another component) is operable to apply a force to an idler roller of the conveyor assembly 502.

In the illustrated example, the carriage 512 is displaced in the directions of arrows 516 and 518, in order to increase or decrease a force applied to the driver roller 506, respectively, by an actuator 520. Particularly, the actuator 520 is a hydraulic cylinder. In other implementations, the actuator 520 may be another type of linear actuator. Flow of hydraulic fluid to and from the actuator 520 is controlled by a valve 522. Actuation of the valve 522 controls flow of the hydraulic fluid to and from the actuator 516 in order to alter a position of the carriage 508. In the illustrated example, the valve 522 is a three-position, solenoid operated valve. In other implementations, other types of valves can be used. Other example valves include a two-way solenoid operated valve, a proportional valve, and a pressure regulating valve. Other valve operable to control fluid flow to and from the actuator 520 to control operation of the actuator 520 and, hence, a position of the carriage 512 are within the scope of the present disclosure.

Hydraulic fluid from a source 524 of high-pressure hydraulic fluid is in communication with the valve 522 via a conduit 526. A collection container 528 is also in communication with the valve 522 via a conduit 530, and a conduit 532 connects the valve 522 to the actuator 520.

In a first or default position of the valve 522, hydraulic fluid from the source 524 is prevented from passing from the conduit 526 to the conduit 532, and the conduit 530 is similarly blocked by the valve 522. In a second position in which the valve 522 is displaced in the direction of arrow 534, and the valve 522 provides fluid communication between the conduit 526 and conduit 532. As a result, the high-pressure hydraulic fluid (or pressure from the hydraulic fluid) from the source 524 is passed through the valve 522 and conducted to the actuator 520, causing the actuator 520 to extend. In response to the extension of the actuator 520, the carriage 512 is displaced in the direction of arrow 516, causing an increase to the force applied to the driver roller 510. As a result, a tension in the endless belt 517 of the conveyor assembly 502 is increased.

The conduit 530 remains isolated by the valve 522 when the valve 522 is in the second position. Additionally, in the second position, the valve 522 prevents flow of hydraulic fluid from the conduit 532 to the conduit 526. That is, the valve 522 permits a flow therethrough in only one direction, i.e., from the conduit 526 to conduit 532.

The valve 522 moves from the first position to the third position by movement of the valve in the direction of arrow 536. In a third position, the conduit 532 is placed in fluid communication with the conduit 530, allowing the hydraulic fluid to flow from the actuator 520 to the collection container 528. As a result of placing the conduits 532 and 530 in fluid communication, hydraulic pressure is removed from the actuator 520, causing the actuator 520 to retract and move the carriage 512 in the direction of arrow 518. As a result, the force applied to the driver roller 510 is reduced, thereby reducing a tension in the endless belt 517 of the conveyor assembly 502. In the third position, the conduit 526 is blocked by the valve 522, preventing passage of hydraulic fluid from the conduit 526 to the conduit 532.

The control system 504 includes an electronic controller 538. In some implementations, the controller 538 is similar to the controller 302, described earlier. The electronic controller 302 is in communication with the valve 522 and is configured to control operation of the valve 522, such as by software executed by a processor of the controller 538. Thus, the controller 538 is operable to place the valve 522 into the first position, the second position, and the third position. The controller 538 may be connected to the valve 522 via a wired or wireless connection or connections. Although the controller 538 is not shown in communication with components other than the valve 522, the controller 538 may be in communication with other components, such as one or more sensors (e.g., one or more rotational speed sensors, a torque sensor, and a position sensor), an input device, display, a database, or other components.

If the controller 538 determines that an increase in belt tension is needed, such as in a manner described earlier, the controller 538 sends a control signal to the valve 522, displacing the valve 522 from the first position to the second position (or from the third position to the second position, depending on the initial position of the valve 522). As a result, high-pressure hydraulic fluid (or pressure thereof) is communicated to the actuator 520, causing the actuator 520 to extend and, as explained above, increase a tension in the endless belt 517. If the controller 538 determines that a decrease in belt tension is needed, the controller 538 sends a control signal to the valve 522 to cause the valve 522 to move from the first position to the third position (or from the second position to the third position, depending upon the initial position of the valve 522). As explained above, in the third position, hydraulic pressure applied to the actuator 520 is reduced, causing the actuator 520 to retract. As a result, the tension in the endless belt 517 of the conveyor assembly 502 is reduced. If the controller 538 determines that the tension in the endless belt 517 has a selected value or is within a selected range of values, then the controller 538 does not send a control signal to the valve 522. With no control signal being transmitted to the valve 522, the valve 522 remains in the default or first position, preventing the flow of hydraulic fluid to or from the actuator 520 and, thus, maintaining the existing hydraulic pressure applied to the actuator 520. As a result, the tension in the endless belt 517 is maintained.

The conveyor assembly 502 also includes a tension indicator 540. The tension indicator 540 may be similar to the tension indicator 234, described above. For example, the tension indicator 540 may be an analog device that includes a pointer 542 and a meter 544 or an electronic device, which may be similar to that described earlier, that includes a display to display a tension condition of the endless belt 517.

As explained earlier, tension in the endless belt 517 may be indicated by a separation distance between the driver roller 510 and an idler roller, which may be similar to idler roller 208, described above. In other implementations, tension in the endless belt 517 may be determined or indicated in other ways. For example, a separation distance between a rotational axis 546 of the driver roller 510 and a location where the actuator 520 connects to the carriage 512 may be used. For example, the actuator 520 may connect to the carriage 512 at a pin connection 548. The separation distance between the pin connection 548 and the rotational axis 546 may be used as an indicator of tension in the endless belt 517. In still other implementations, an amount of extension of the actuator 520 may be used as a separation distance and, thus, an indicator of tension in the endless belt 517. Sensors, such as a linear variable differential transformer (LVDT), a string potentiometer sensor, and a rotary potentiometer, may be used to measure a separation distance between components of the conveyor assembly 502 that are movable relative to each other. This measured distance can be used as a proxy for a tension in the endless belt 517. As explained above, example components include the driver roller, the idler roller, the carriage, or a location on the carriage. Other sensors operable to detect the separation between the components or an amount of extension of the actuator may also be used. Although these examples are made in the context of the control system 500 of FIG. 5, these example are also applicable to other control systems within the scope of the present disclosure.

Figure 9:
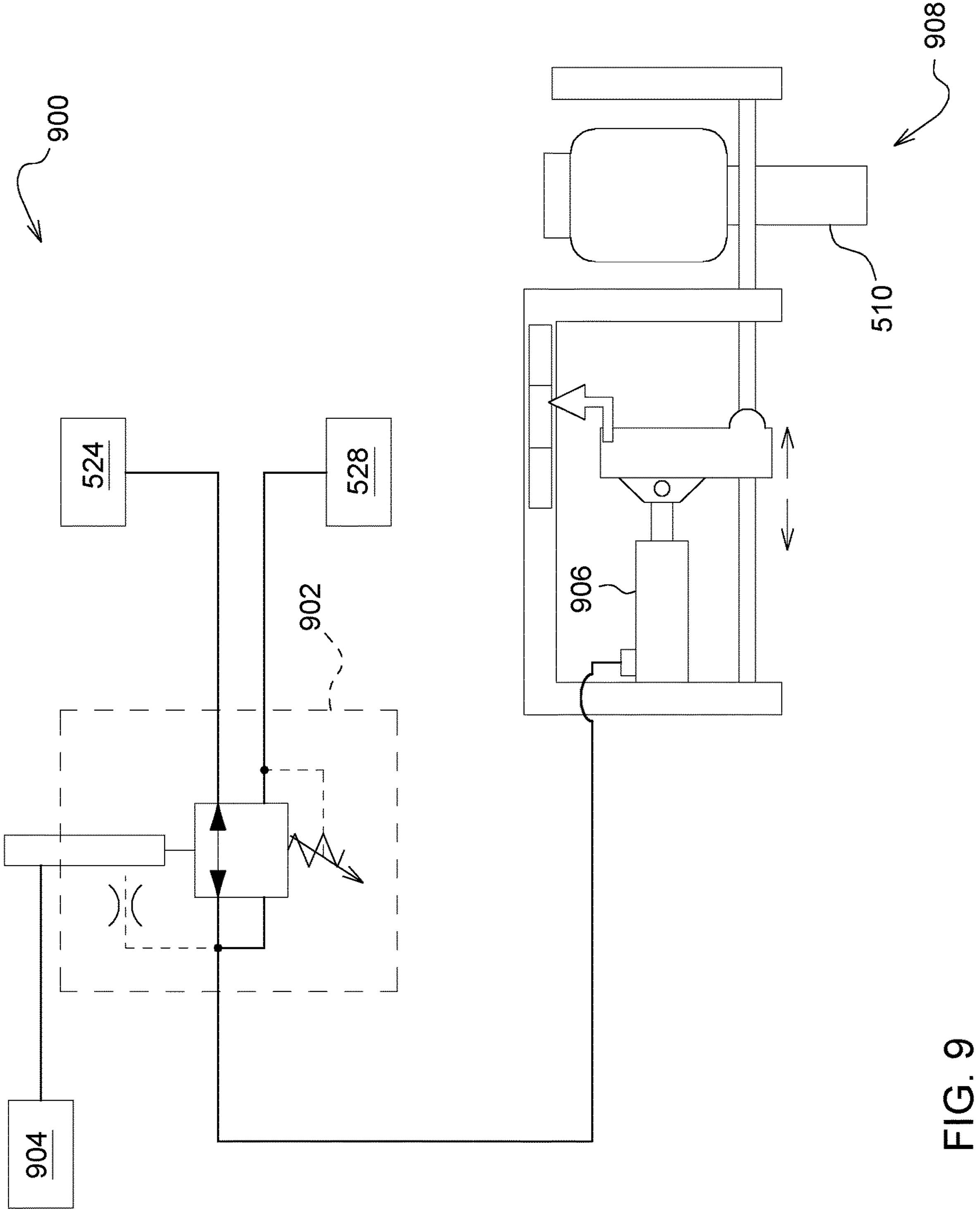
FIG. 9 is a partial schematic, partial diagrammatic view of a portion of another example belt tension control system in which a pressure regulating valve is included, according to some implementations of the present disclosure.

FIG. 9 is a detail view of another example belt tension control system 900 that is similar to the belt tension control system of FIG. 5 except that the belt tension control system 900 includes a pressure reducing valve 902 in place of the three-position, solenoid operated valve, i.e., valve 522, shown in FIG. 5. The pressure reducing valve 902 illustrates another example valve that are controllable, such as via controller 904 (which may be similar to controller 538) to control the flow of hydraulic fluid to and from the actuator 906. The controller 904 may operate according to a method, such as the example method illustrated in FIG. 4, to alter a position of an actuator 906 of a conveyor assembly 908 to control amount of tension in an endless belt of the conveyor assembly 908. Similar to controller 538 of the belt tension system of FIG. 5 and other belt tension systems within the scope of the present disclosure, the controller 904 receives input from sensors, such as a torque sensor (which may be similar to torque sensor 308), a position sensor (which may be similar to position sensor 310), and a belt protection system (which may be similar to belt protection system 312).

Figure 10:
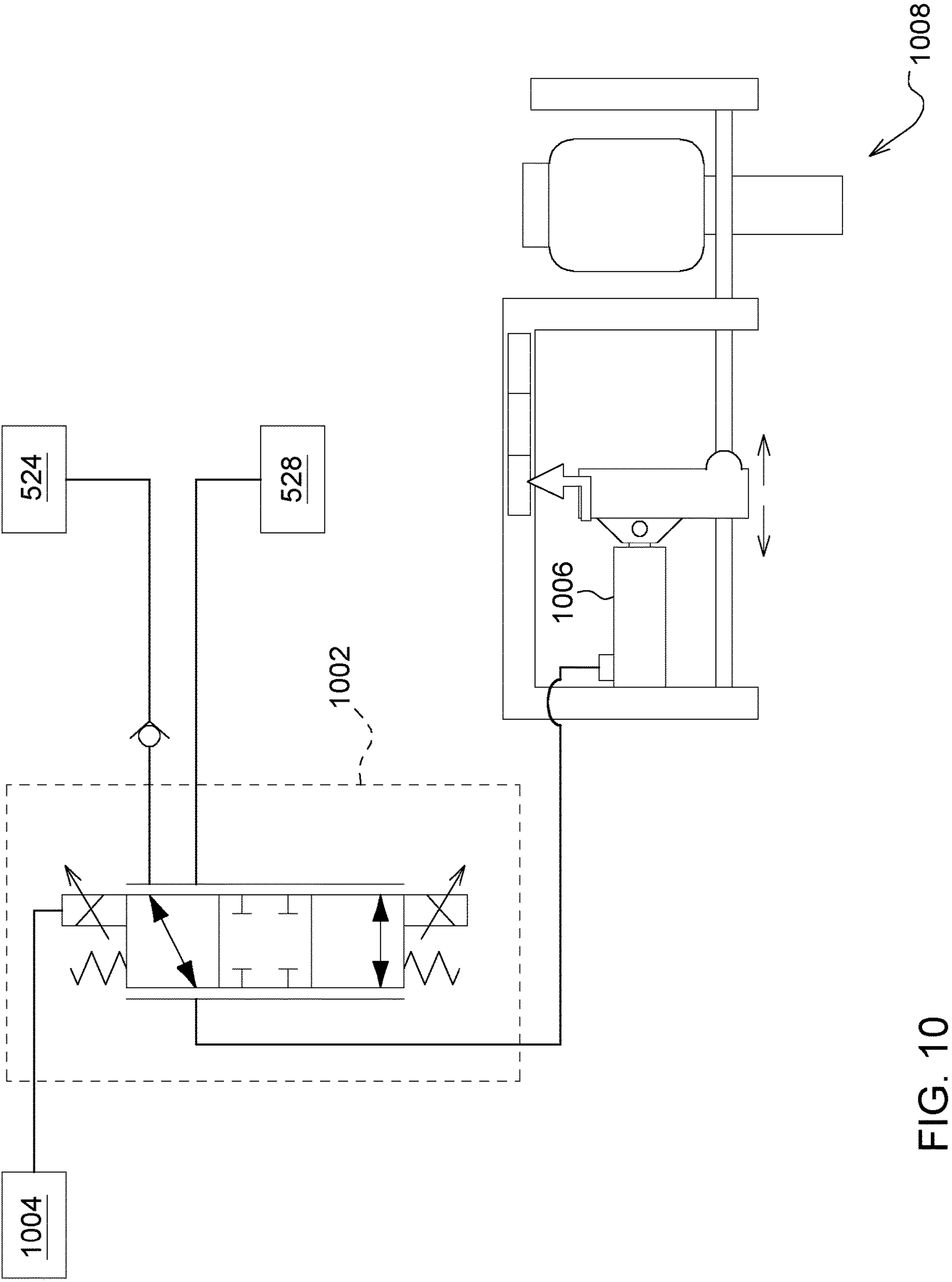
FIG. 10 is a partial schematic, partial diagrammatic view of a portion of another example belt tension control system in which a proportional valve is included, according to some implementations of the present disclosure.

FIG. 10 is another example belt tension control system 1000 that is similar to the belt tension control system of FIG. 5 except that the belt tension control system 1000 includes a valve 1002 that is a proportional, solenoid operated valve. The valve 1002 is used in place of the valve 522. Controller 1004 of the belt tension control system 1000 is communicably connected to the valve 1002 and is operable to control the valve 1002 to control flow of hydraulic fluid to and from an actuator 1006. The controller 1004 may operate according to a method, such as the method illustrated in FIG. 4, to alter a position of an actuator 1006 of a conveyor assembly 1008 to control amount of tension in an endless belt of the conveyor assembly 1008. Similar to controller 538 of the belt tension system of FIG. 5 and other belt tension systems within the scope of the present disclosure, the controller 1004 receives input from sensors, such as a torque sensor (which may be similar to torque sensor 308), a position sensor (which may be similar to position sensor 310), and a belt protection system (which may be similar to belt protection system 312).

Figure 11:
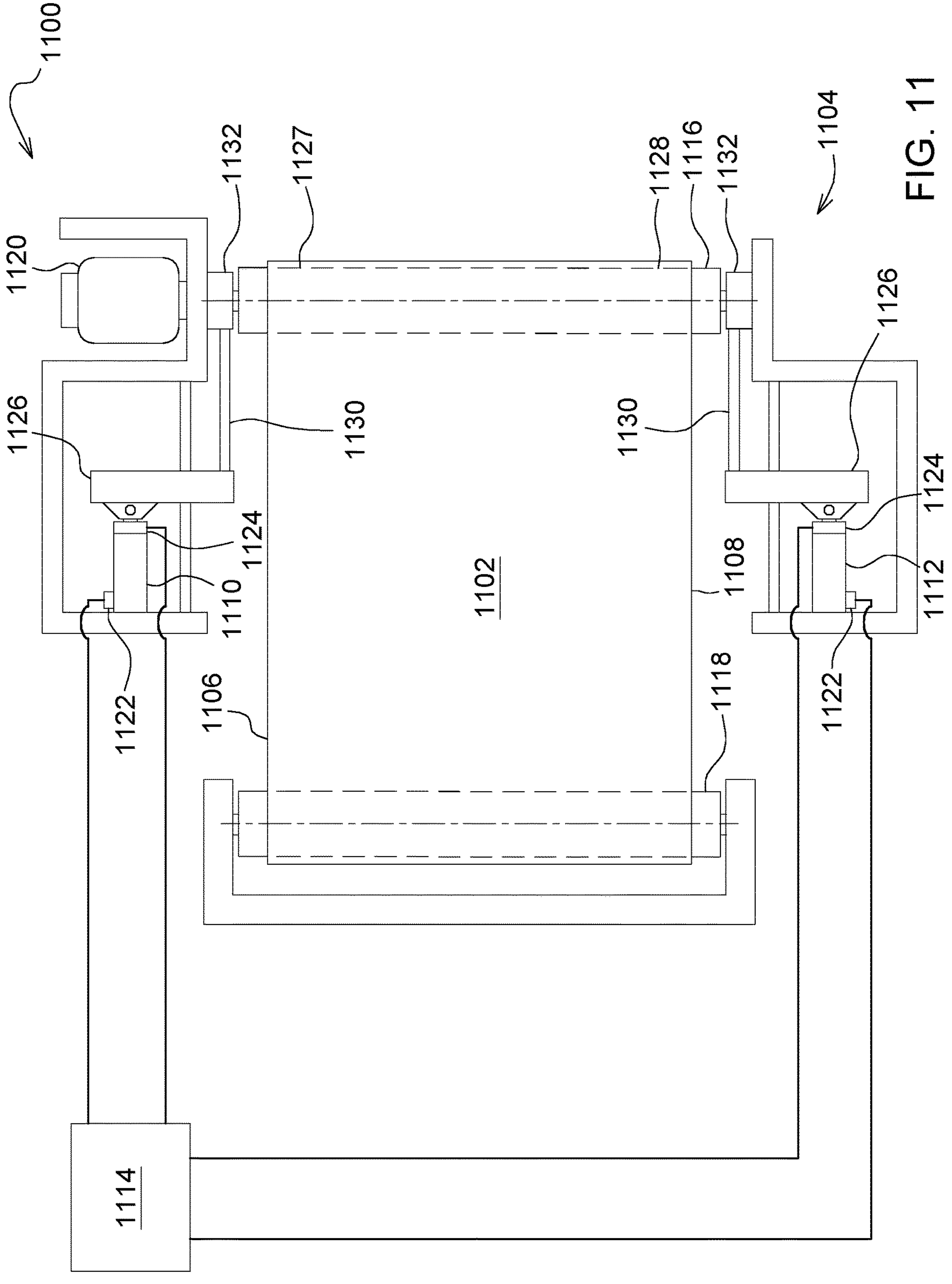
FIG. 11 is a partial schematic, partial diagrammatic view of another example belt tension control system, according to some implementations of the present disclosure.

FIG. 11 is another example belt tension control system 1100 that includes two actuators to control, e.g., reduce or eliminate, mistracking of endless belt 1102 of a conveyor assembly 1104. The belt tension control system 1100 detects a tension differential in opposing sides 1106 and 1108 of the endless belt 1102 and controls actuators 1110, 1112 associated with sides 1106 and 1108, respectively, to equalize the tension in both sides 1106 and 1108 of the endless belt 1102.

The belt tension control system 1100 includes the conveyor assembly 1104 and a controller 1114. The controller 1114 may be similar to one or more of the other controllers described herein (e.g., controllers 248, 302, 538, 614, 710, 820, 904, or 1004), and the controller 1114 may be communicably connected to various sensors, such as a torque sensor (which may be similar to torque sensor 308), a position sensor (which may be similar to position sensor 310), and rotational speed sensors (which may be similar to rotational speed sensors 304 and 306). The rotational speed sensors may be configured as a belt protection system, which may be similar to belt protection system 312. In some instances, the controller 1114 may also be communicable connected to other types of sensors.

The conveyor assembly 1104 includes the endless belt 1102, a driver roller 1116, a follower roller 1118. The endless belt 1102 is movably mounted on the driver roller 1116 and follower roller 1118. The conveyor assembly 1104 also includes a motive device 1120, coupled to and operable to drive the driver roller 1116, and the actuators 1110 and 1112. Example actuators 1110 and 1112 include any of the types of actuators within the scope of the present disclosure.

Each of the actuators 1110 and 1112 may include sensors 1122 and 1124. The sensors 1122 detect a force applied by the respective actuators 1110 to the driver roller 1116. For example, where the actuators 1110 are hydraulic actuators, the sensors 1122 may be pressure transducers that detects a hydraulic pressure within the actuators 1110 and 1112. As explained earlier, this hydraulic pressure can be used to determine a tension in the respective side 1106 and 1108 of the endless belt 1102. The sensors 1112 include sensors such as LVDT sensors, string potentiometer sensors, and rotary sensors. The sensors 1124 are used to determine an amount of separation between the driver roller 1116 and the follower roller 1118, as described earlier. In some implementations, the sensors 1124 may be omitted.

A carriage 1126 is coupled to each of the actuators 1110 and 1112. The carriages 1126 are coupled to opposing ends 1127 and 1128 of the driver roller 1116 via shafts 1130. In some implementations, the shafts 1130 are connected to the driver roller 1116 via collars 1132. In some implementations, the carriages 1126 may be coupled to the driver roller 1116 in other ways. Although the actuators 1126 are described as being operable to alter a load or position of the driver roller 1116, in other implementations, the actuators may be coupled to and operable to alter a load and position of the follower roller 1116.

As indicated, the sensors 1122 and 1124 are provided for each actuator 1110 and 1112. As such, the controller 1114 is operable detect a tension in each side 1106 and 1108 of the endless belt 1102 using the sensors 1122. Using the determined tension in each side 1106 and 1108 of the endless belt 1102, the controller 1114 is operable to detect an imbalance of tension between the sides 1106 and 1108 of the endless belt 1102. This imbalance in tension in the endless belt 1102 can cause mistracking of the endless belt 1102 on the driver roller 1116 and the follower roller 1118. In response, the controller 1114 is operable to alter a position of the actuators 1110 and 1112 in order to equalize the tension in sides 1106 and 1108 of the endless belt 1102 and, therefore, eliminate or reduce the mistracking of the endless belt 1102. For example, the controller 1114 is operable to extend one or both of the actuators, retract one or more of the actuators, or extend one actuator and retract the other actuator. The controller 1114 can use the position sensors 1124 to determine whether to extend one or both actuators, retract one or both actuators, or extend one actuator and retract the other based on the position of the respective ends 1127 and 1128 of the driver roller 1116.

Figure 6:
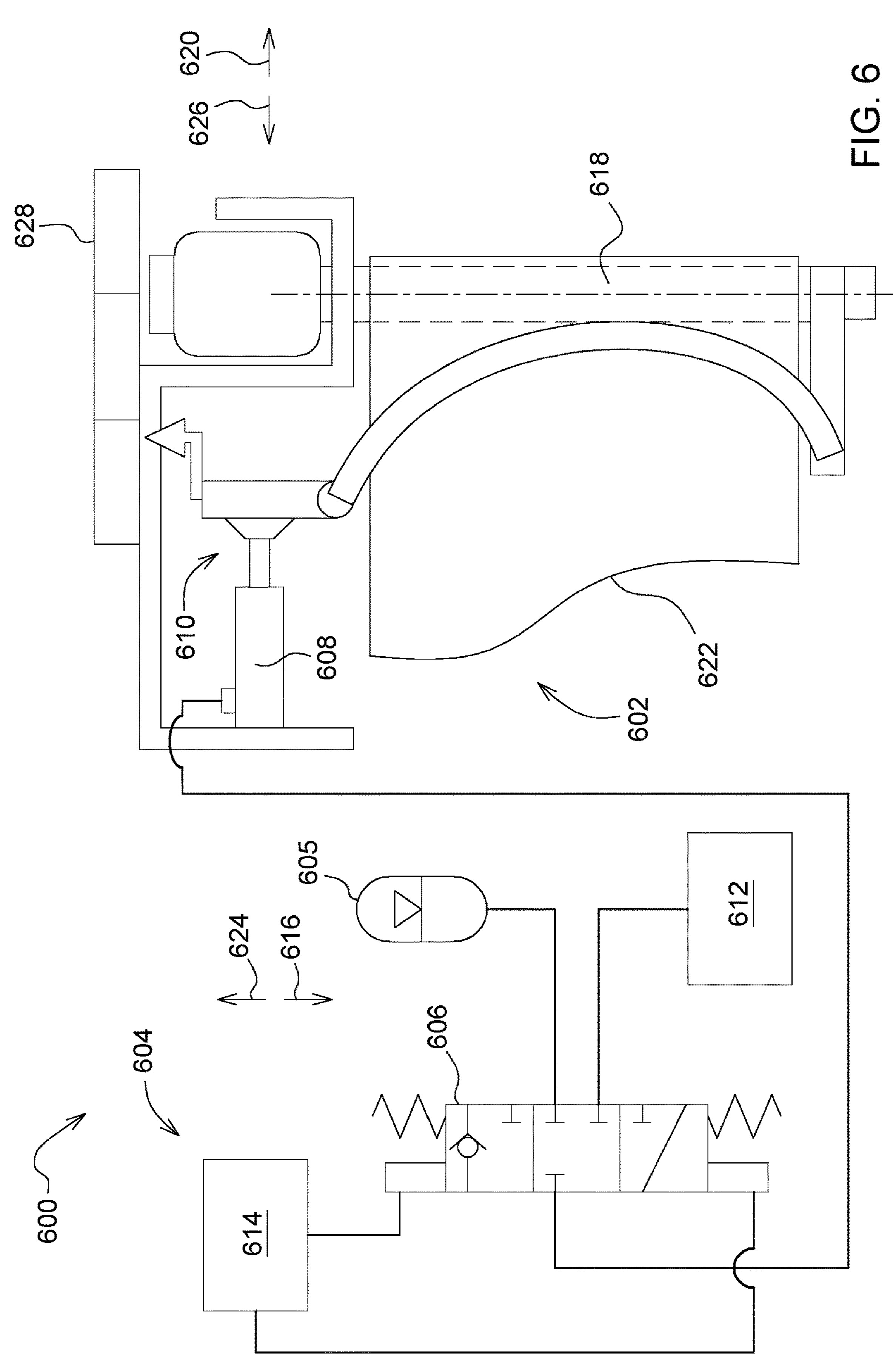
FIG. 6 is a partial schematic, partial diagrammatic view of a portion of another example belt tension control system, according to some implementations of the present disclosure.

FIG. 6 is a partial schematic, partial diagrammatic view of a portion of another example belt tension control system 600 that includes a conveyor assembly 602 and a control system 604. The belt tension control system 600 is similar to belt tension control system 500 except that the belt tension control system 600 includes a hydraulic accumulator 605 as the source of pressurized hydraulic fluid. The conveyor assembly 602 is similar to the conveyor assembly 502, and the control system 604 is similar to, and operates in a similar way as, the control system 504 or control system 300. The belt tension control system 600 includes a valve 606, and, like the valve 522, the valve 606 is a three-position, solenoid operated valve and operates in the same manner as described above with respect to valve 522. Like valve 522, the valve 606 has a first or default position in which fluid flow to or from an actuator 608 of a tensioner 610 of the conveyor assembly 602 is prevented; a second position in which hydraulic fluid (or the pressure thereof) is communicated to the actuator 608; and a third position in which hydraulic fluid (or the pressure thereof) from the actuator 608 is communicated to a collection container 612. In the second position, the valve 606 permits fluid flow in only one direction, i.e., towards the actuator 608.

The control system 604 includes an electronic controller 614, similar to the controller 538, and is in communication with the valve 606. Although the controller 614 is not shown in communication with components other than the valve 606, the controller 614 may be in communication with other components, such as one or more sensors (e.g., one or more rotational speed sensors, a torque sensor, and a position sensor), an input device, display, a database, or other components.

The controller 614 is configured to operate the valve 606, for example, by software executed by a processor of the controller 614. In operation, with the valve 606 in the first position, the controller 614 may determine that an increase in belt tension is needed, such as in a manner described earlier. In response, the controller 614 actuates the valve 606 from the first position to the second position (e.g., by displacing the valve 606 in the direction of arrow 616), allowing pressurized hydraulic fluid from the hydraulic accumulator 605 to flow to the actuator 608. In response, the actuator 608 extends, causing a driver roller 618 to become displaced in the direction of arrow 620 and resulting in an increase in tension in an endless belt 622 of the conveyor assembly 602.

The controller 614 may determine that a decrease in belt tension is needed, such as in a manner described earlier. In response, the controller 614 causes the valve 606 to move to the third position via movement in the direction of arrow 624. As a result, hydraulic fluid is permitted to pass through the valve 606 and to the collection container 612, thereby causing the actuator to retract in the direction of arrow 626 and reducing a tension in the endless belt 618. Further, the controller 614 may determine that a change in tension in the endless belt 622 is not needed. In that case, the controller 614 maintains the valve 606 in the first position, preventing fluid flow to or fluid flow from the actuator 608. As a result, the tension in the endless belt 622 remains unchanged. In some implementations, the belt tension control system 600 may include a tension indicator similar to tension indicator 234 and 540 described above.

FIGS. 5 and 6 provide example arrangements of the tensioners 506 and 610 in which actuators 520 and 608 extend to increase tension in an endless belt and retract to reduce tension in the endless belt. However, the scope of the disclosure is not so limited. Rather, in other implementations, tensioners within the scope of the present disclosure encompass actuators that increase tension when retracted and decrease tension when extended. Further, although hydraulic linear actuators 520 and 608 are illustrated, in other implementations, hydraulic rotary actuators may be used to alter a position of the respective tensioners 506 and 610 and, thus, alter a tension level in the respective endless belts 517 and 622. The hydraulic rotary actuators may be arranged in a manner similar to the electric rotary actuator 804 described in more detail below in the context of FIG. 8.

Figure 7:
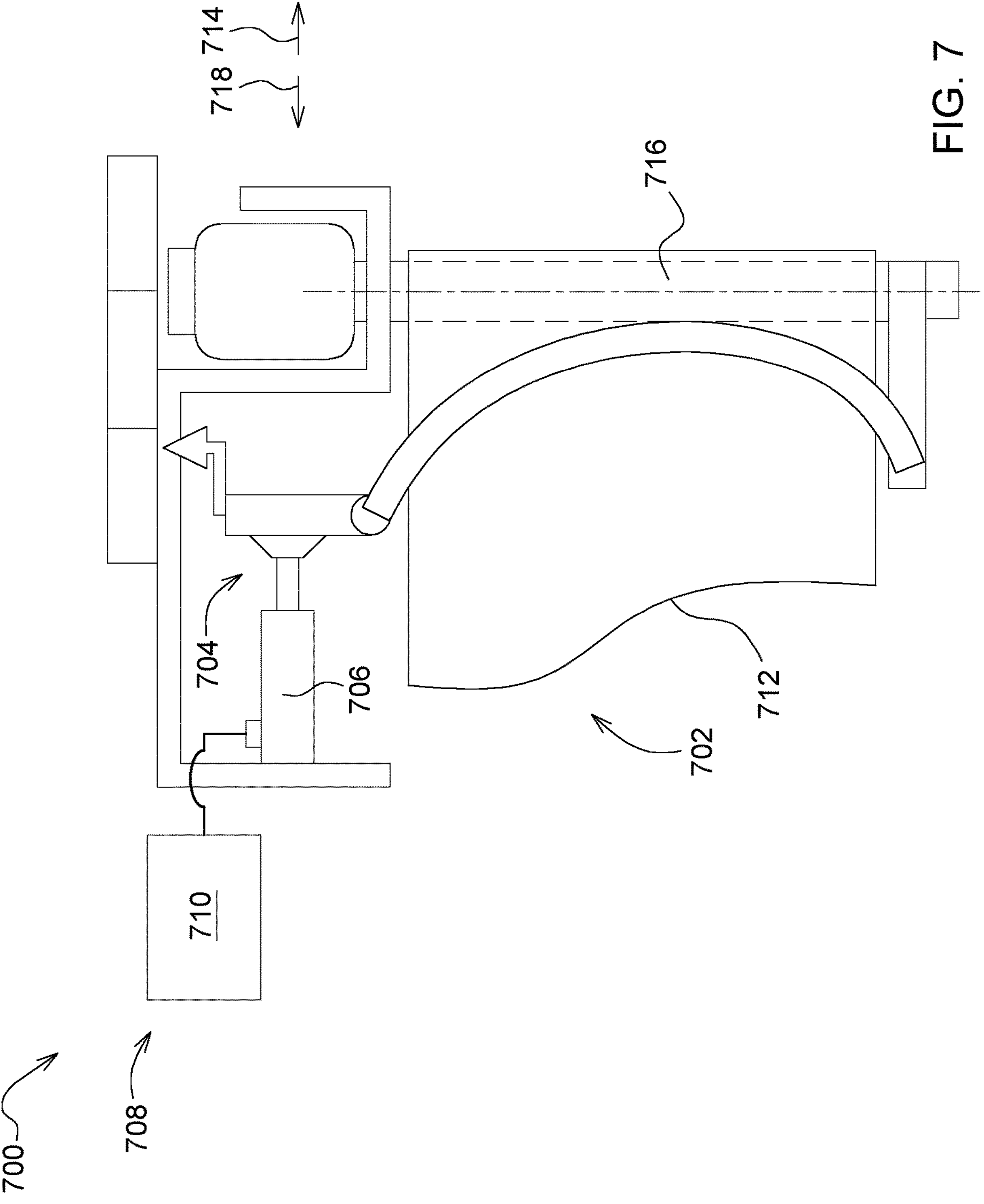
FIG. 7 is a partial schematic, partial diagrammatic view of a portion of another example belt tension control system, according to some implementations of the present disclosure.

FIG. 7 is a partial schematic, partial diagrammatic view of a portion of another example belt tension control system 700. The belt tension control system 700 includes a conveyor assembly 702 that includes a tensioner 704 having an electric actuator 706 to alter a tension in an endless belt 708 of the conveyor assembly 702. In the illustrated example, the electric actuator 706 is an electric linear actuator. The belt tension control system 700 also includes a control system 708. The control system 708 may be similar to the example control systems 300, 504, or 604. The control system 708 includes an electronic controller 710 that is configured to determine a tension level in an endless belt 712 of the conveyor assembly 702 and whether to maintain, increase, or decrease the determined tension level.

The controller 710 may be similar to controllers 302, 524, or 614, described earlier, and is in communication with the actuator 706 of the tensioner 704. The controller 710 is configured to control operation of the actuator 706, such as by software executed by a processor of the controller 710. Although the controller 710 is not shown in communication with components other than the actuator 706, the controller 710 may be in communication with other components, such as one or more sensors (e.g., one or more rotational speed sensors, a torque sensor, and a position sensor), an input device, display, a database, or other components.

The controller 710 may determine that an increase in belt tension is needed, such as in a manner described earlier. In response, the controller 710 sends a control signal to the actuator 706 to cause the actuator 706 to extend in the direction of arrow 714, increasing a force on driver roller 716 and, consequently, increasing a tension level in the endless belt 712. The controller 710 may determine that a decrease in belt tension is needed, such as in a manner described earlier. In response, the controller 710 sends a control signal to the actuator 706 to cause the actuator 706 to retract in the direction of arrow 718, thereby reducing a tension level in the endless belt. The tensioner 704 may also include a tension indicator 720, which may be similar to the tension indicators 234, 540, and 628 described earlier.

Figure 8:
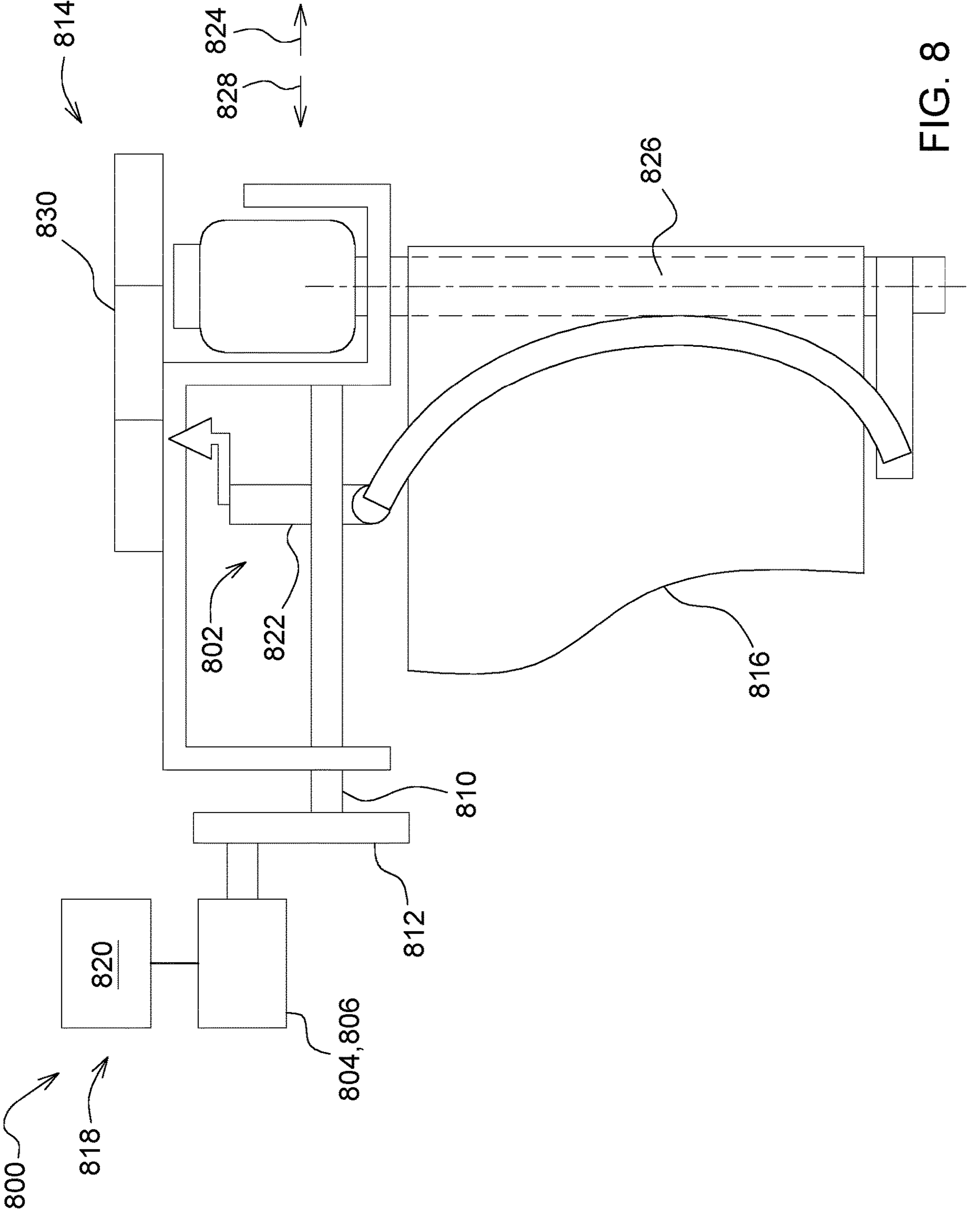
FIG. 8 is a partial schematic, partial diagrammatic view of a portion of another example belt tension control system, according to some implementations of the present disclosure.

FIG. 8 is a partial schematic, partial diagrammatic view of another example belt tension control system 800. The belt tension control system 800 is identical to that of the belt tension control system 700 except that a tensioner 802 includes an electric rotary actuator 804, such as an electric motor. In some implementations, the electric rotary actuator 804 includes an electric motor 806 that is coupled to a threaded shaft 810 via a belt and pulley system 812. In other implementations, the electric motor 806 couples to the threaded shaft 810 via set of gears. In still other implementations, the electric rotary actuator 804 may be coupled to the threaded shaft 810 in other ways. For example, in some implementations, the electric motor 806 may be directly connected to the threaded shaft 810.

The belt tension control system 800 includes a conveyor assembly 814 that includes the tensioner 802 to alter a tension in an endless belt 816 of the conveyor assembly 814. The belt tension control system 800 also includes a control system 818. The control system 818 may be similar to the example control systems 300, 504, 604, or 708 and includes an electronic controller 820 that is configured to determine a tension level in the endless belt 816 of the conveyor assembly 814 and whether to maintain, increase, or decrease the determined tension level.

The tensioner 802 also includes a carriage 822 that threadably engages the threaded shaft 810 such that rotation of the threaded shaft 810 in a first rotational direction causes the carriage 822 to move in a first linear direction and rotation of the threaded shaft 810 in a second rotational direction, opposite the first rotational direction, causes the carriage 822 to move in a second linear direction opposite the first linear direction.

The controller 820 may determine that an increase in belt tension is needed, such as in a manner described earlier. In response, the controller 820 sends a control signal to the rotary actuator 804 to displace the carriage 822 in the direction of arrow 824, increasing a force on driver roller 826 and, consequently, increasing a tension level in the endless belt 816. The controller 820 may determine that a decrease in belt tension is needed, such as in a manner described earlier. In response, the controller 820 sends a control signal to the rotary actuator 804 to displace the carriage 822 in the direction of arrow 828, decreasing a force on driver roller 826 and, consequently, decreasing a tension level in the endless belt 816. The tensioner 802 may also include a tension indicator 830, which may be similar to the tension indicators 234, 540, 628, or 720 described earlier.

Without in any way limiting the scope, interpretation, or application of the claims appearing below, a technical effect of one or more of the example implementations disclosed herein is maintaining a desired level of tension in an endless belt automatically. Another technical effect of one or more of the example implementations disclosed herein is reduced costs associated with an endless belt by maintaining an endless belt in at a desired level of tension. Another technical effect of one or more example implementations disclosed herein is increased production efficiency and reduces a burden on an operator of a machine by avoiding downtime of the machine associated with the operator having to manually determine and implement any change in belt tension.

Figure 12:
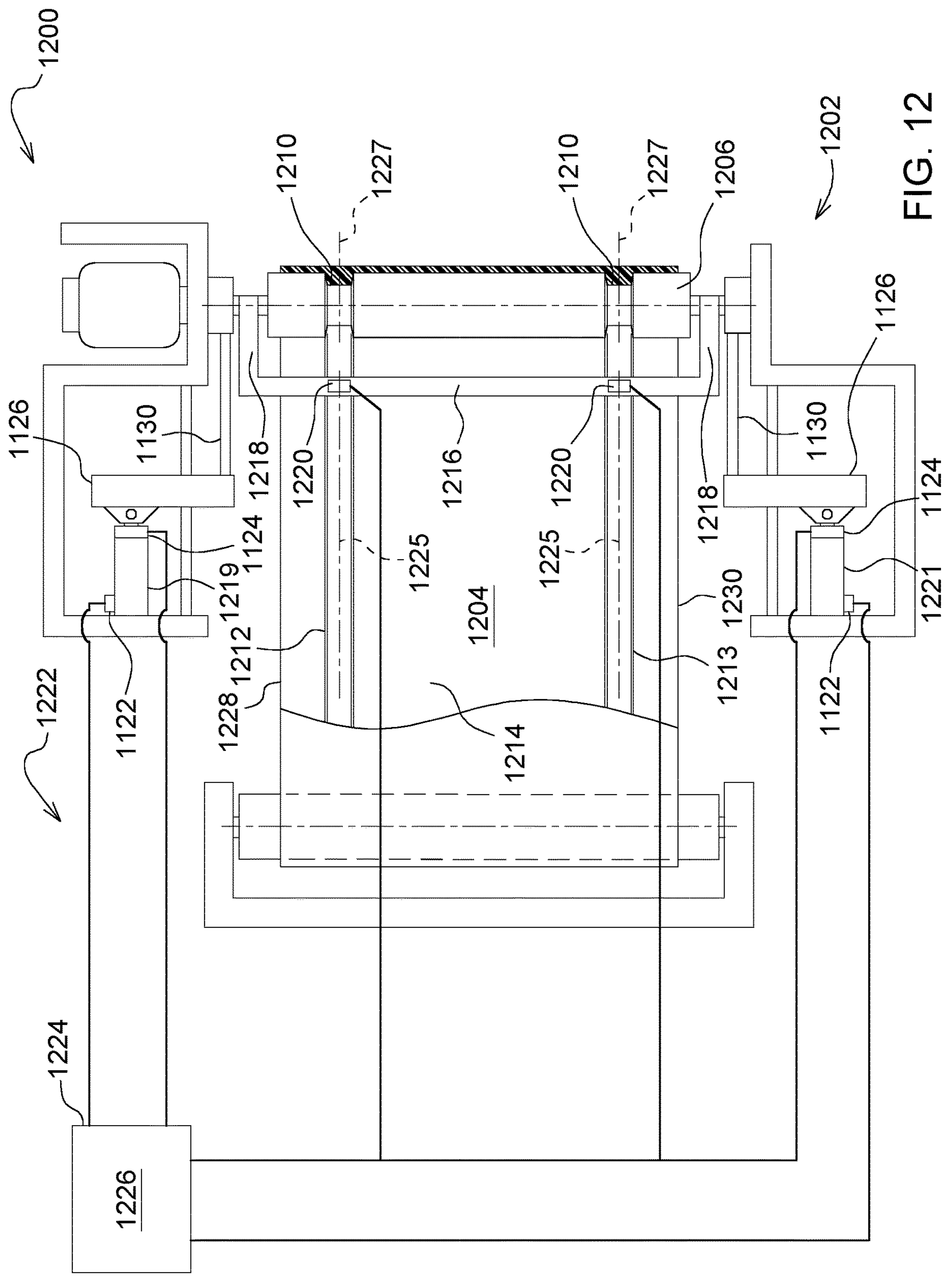
FIG. 12 is top view of another tension control system, according to some implementations of the present disclosure.

FIG. 12 is top view of another tension control system 1200. Particularly, FIG. 12 shows a portion of a conveyor assembly 1202 of the tension control system 1200. FIG. 12 shows the conveyor assembly 1202 having an endless belt 1204 and a roller 1206. The conveyor assembly 1202 may be similar to the conveyor assembly 1104, described earlier, except that the endless belt includes raised features 1212 and 1213, described in more detail below, and the roller 1206 includes grooves 1210, also described in more detail below. Although one roller 1206 is illustrated, the conveyor assembly 1202 may include two or more rollers. One of the rollers may be a driven roller, while another one of the rollers may be a driver roller. The roller 1206 includes grooves 1210 that receives raised features 1212, 1213 formed on an inner surface 1214 of the endless belt 1204. Although the roller 1206 is shown as including two grooves 1210, in other implementations, the roller 1206 may include additional or fewer grooves 1210. The raised features 1212, 1213 are illustrated as being continuous on the endless belt 1204. In some implementations, the raised features 1212, 1213 may include a plurality of discontinuous sections. The grooves 1210 and the raised features 1212, 1213 cooperate to maintain the endless belt 1204 in a desired positional relationship relative to the roller 1206.

The illustrated conveyor assembly 1202 also includes a beam 1216 extending parallel to the roller 1206. The beam 1216 and the roller 1206 are both mounted to brackets 1218 that couple the beam 1216 and the roller 1206 together. The roller 1206 is rotatable relative to the beam 1216 and brackets 1218. Movement of one of the beam 1216 and the roller 1206 causes movement of the other of the beam 1216 and the roller 1206. Cameras 1220 (or other image device)

are mounted to the beam 1216 at a position such that each camera 1220 views one of the grooves 1210. The cameras 1220 are operable to capture one or more images (including still images and video images) showing the relationship between the groove 1210 and the associated raised feature 1212, 1213. In the illustrated example, two cameras 1220 are illustrated, with each positioned to image one of the grooves 1210. In some implementations, a single camera 1220 is used; particularly, in some implementations, a single camera 1220 is used notwithstanding how many grooves the roller 1206 includes.

The conveyor assembly 1202 also includes a tension system 1222 that is operable to adjust tension in the endless belt 1204. The tension system 1222 may be similar to the belt tension control system 1100, described herein. That is, in some implementations, the tension system 1222 includes a first actuator 1219 operable to alter a tension level in a first lateral side 1228 of the endless belt 1204 and a second actuator 1221 operable to alter a tension level in a second lateral side 1230 of the endless belt 1204. In other implementations, the tension system 1222 may be similar to one or more of the tensioners described herein (e.g., tensioners 214, 506, 610, or 704).

The tension system 1222 also includes a control system 1224. The control system 1224 may be similar to control system 300 and includes a controller 1226. The controller 1226 receives signals output from the cameras 1220. The signals output from the cameras 1220 includes image data that are images captured by the cameras of the groove 1210 and raised features 1212, 1213. The controller 1220 processes the received image data.

Figure 13:
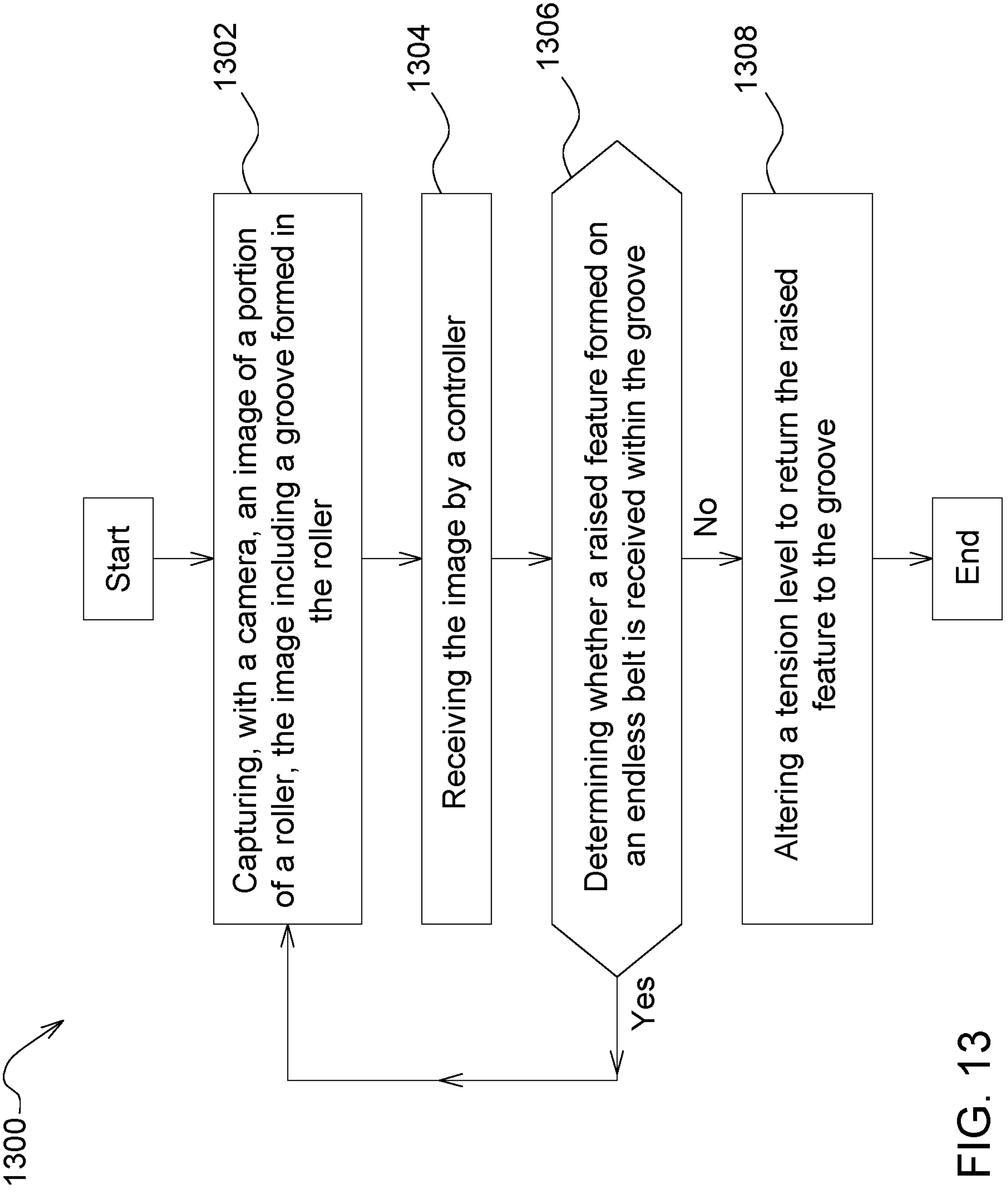
FIG. 13 is a flowchart of an example method for automatically controlling tension of an endless belt, according to some implementations of the present disclosure.

In operation, the cameras 1220 capture images of a portion of the roller 1206 that includes the grooves 1210, as shown at 1302 in the example method 1300 of FIG. 13. At 1304, the image data are received by the controller 1226. At 1306, based on the received image data, the controller 1226 determines whether the raised features 1212, 1213 are positioned within the respective grooves 1210. For example, in some implementations, the controller 1226 determines whether a longitudinal axis 1225 of each of the raised features 1212 and 1213 is aligned with a respective central axis 1227 of the grooves 1210. If the raised features 1212, 1213 are within the respective grooves 1210, then no corrective action is needed, and the method 1300 returns to 1302. If the controller 1226 determines, based on the received image data, that one or more of the raised features 1212, 1213 are outside of the respective grooves 1210 (either partially or fully outside of the groove 1210), at 1308, the controller 1226 sends control one or more control signals to the tension system 1222 to alter a tension level in one or both of the sides 1228 and 1230 of the endless belt 1204. For example, in the context of FIG. 12, if the raised feature 1213 was positioned to the right (i.e., moved in a direction of arrow 1232) of the groove 1210 (and, particularly, if the raised feature 1213 was removed from the groove 1210), the controller 1226 transmits a signal to the tensioner system 1222 to cause a tension level in the side 1230 of the endless belt to be decreased, cause a tension level in the side 1228 of the endless belt 1204 to be increased, or both. As a result of the change in tension level in the endless belt 1204, the raised feature 1213 returns to the groove 1210 to maintain proper tracking of the endless belt 1204 relative to the roller 1206.

The controller 1226 continues to cause the tensioner system 1222 to alter a tension level in the endless belt 1204, e.g., a tension level in the side 1230 of the endless belt 1204, until the raised feature 1213 is returned to the groove 1210 (or until the raised feature 1213 occupies a desired position within the groove 1210). The controller 1226 ceases operation of the tensioner system 1222 when the controller 1226, using the image data received from the camera 1220) detects the raised feature 1213 at a desired position relative to the groove 1210 (e.g., centered within the groove 1210).

The method 1300 returns to 1302, and the method 1300 repeats to continuously monitor tracking of the endless belt 1204. As a result, tracking of the endless belt 1204 relative to the roller 1206 is maintained. Thus, in some instances, the controller 1226 continues to monitor the relative positions of the raised feature 1213 and the groove 1210 based on the image data received from the camera 1220 and operate the tensioner system 1222 to alter belt tension (e.g., a tension in the side 1230 of the endless belt 1204) when the controller 1226 detects that the raised feature 1213 has moved from a desired position relative to the groove 1210 (e.g., when the raised feature 1213 has become removed from the groove 1210).

Figure 14:
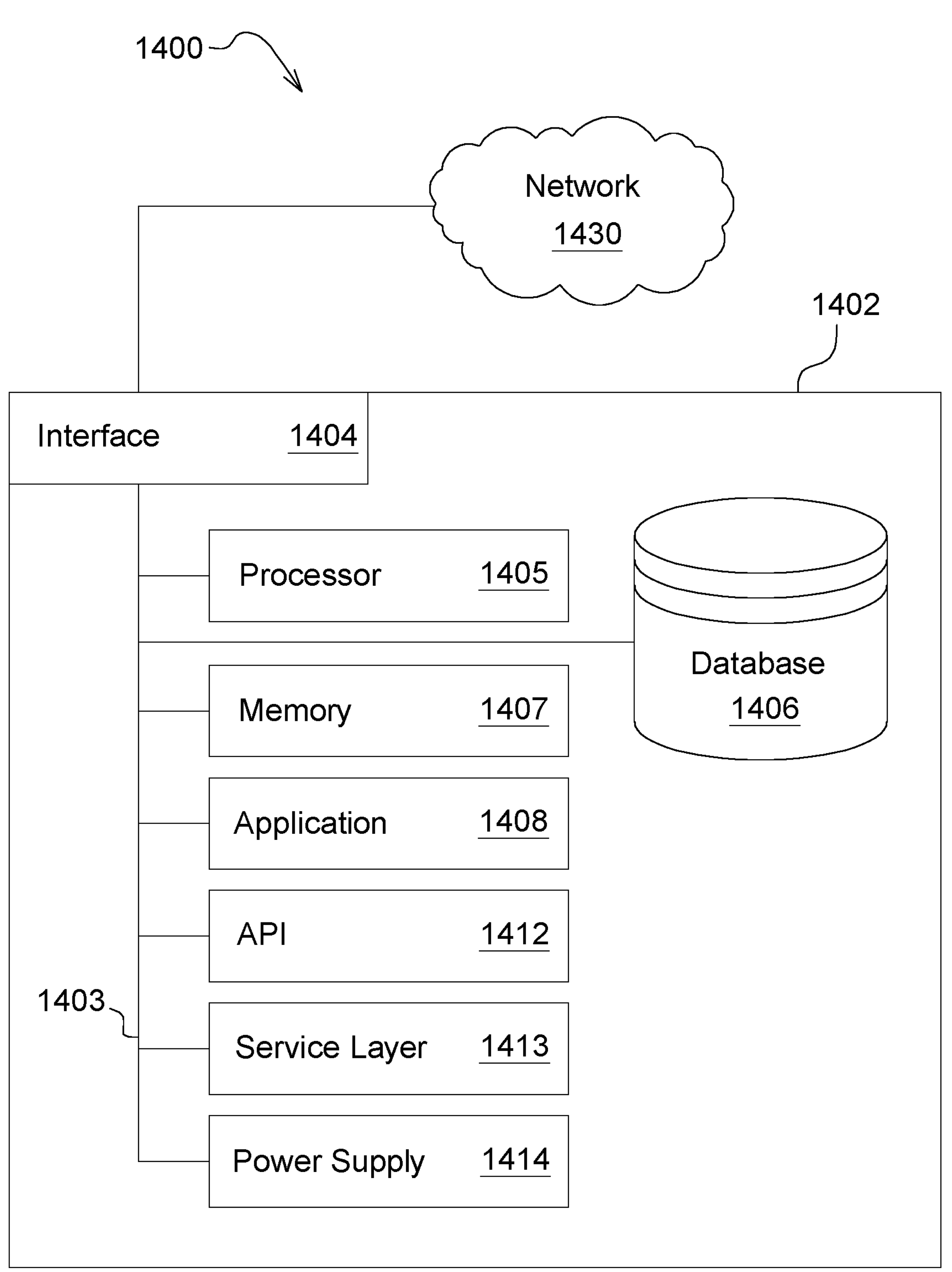
FIG. 14 is a block diagram illustrating an example computer system used to provide computational functionalities associated with described algorithms, methods, functions, processes, flows, and procedures as described in the present disclosure, according to some implementations of the present disclosure.

FIG. 14 is a block diagram of an example computer system 1400 used to provide computational functionalities associated with described algorithms, methods, functions, processes, flows, and procedures described in the present disclosure, according to some implementations of the present disclosure. The illustrated computer 1402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1402 can include input devices such as keypads, keyboards, and touch screens that can accept user information. Also, the computer 1402 can include output devices that can convey information associated with the operation of the computer 1402. The information can include digital data, visual data, audio information, or a combination of information. The information can be presented in a graphical user interface (UI) (or GUI).

The computer 1402 can serve in a role as a client, a network component, a server, a database, a persistency, or components of a computer system for performing the subject matter described in the present disclosure. The illustrated computer 1402 is communicably coupled with a network 1430. In some implementations, one or more components of the computer 1402 can be configured to operate within different environments, including cloud-computing-based environments, local environments, global environments, and combinations of environments.

At a high level, the computer 1402 is an electronic computing device operable to receive, transmit, process, store, and manage data and information associated with the described subject matter. According to some implementations, the computer 1402 can also include, or be communicably coupled with, an application server, an email server, a web server, a caching server, a streaming data server, or a combination of servers.

The computer 1402 can receive requests over network 1430 from a client application (for example, executing on another computer 1402). The computer 1402 can respond to the received requests by processing the received requests using software applications. Requests can also be sent to the computer 1402 from internal users (for example, from a command console), external (or third) parties, automated applications, entities, individuals, systems, and computers.

Each of the components of the computer 1402 can communicate using a system bus 1403. In some implementations, any or all of the components of the computer 1402, including hardware or software components, can interface with each other or the interface 1404 (or a combination of both), over the system bus 1403. Interfaces can use an application programming interface (API) 1412, a service layer 1413, or a combination of the API 1412 and service layer 1413. The API 1412 can include specifications for routines, data structures, and object classes. The API 1412 can be either computer-language independent or dependent. The API 1412 can refer to a complete interface, a single function, or a set of APIs.

The service layer 1413 can provide software services to the computer 1402 and other components (whether illustrated or not) that are communicably coupled to the computer 1402. The functionality of the computer 1402 can be accessible for all service consumers using this service layer. Software services, such as those provided by the service layer 1413, can provide reusable, defined functionalities through a defined interface. For example, the interface can be software written in JAVA, C++, or a language providing data in extensible markup language (XML) format. While illustrated as an integrated component of the computer 1402, in alternative implementations, the API 1412 or the service layer 1413 can be stand-alone components in relation to other components of the computer 1402 and other components communicably coupled to the computer 1402. Moreover, any or all parts of the API 1412 or the service layer 1413 can be implemented as child or sub-modules of another software module, enterprise application, or hardware module without departing from the scope of the present disclosure.

The computer 1402 includes an interface 1404. Although illustrated as a single interface 1404 in FIG. 14, two or more interfaces 1404 can be used according to particular needs, desires, or particular implementations of the computer 1402 and the described functionality. The interface 1404 can be used by the computer 1402 for communicating with other systems that are connected to the network 1430 (whether illustrated or not) in a distributed environment. Generally, the interface 1404 can include, or be implemented using, logic encoded in software or hardware (or a combination of software and hardware) operable to communicate with the network 1430. More specifically, the interface 1404 can include software supporting one or more communication protocols associated with communications. As such, the network 1430 or the interface's hardware can be operable to communicate physical signals within and outside of the illustrated computer 1402.

The computer 1402 includes a processor 1405. Although illustrated as a single processor 1405 in FIG. 14, two or more processors 1405 can be used according to particular needs, desires, or particular implementations of the computer 1402 and the described functionality. Generally, the processor 1405 can execute instructions and can manipulate data to perform the operations of the computer 1402, including operations using algorithms, methods, functions, processes, flows, and procedures as described in the present disclosure.

The computer 1402 also includes a database 1406 that can hold data for the computer 1402 and other components connected to the network 1430 (whether illustrated or not). For example, database 1406 can be an in-memory, conventional, or a database storing data consistent with the present disclosure. In some implementations, database 1406 can be a combination of two or more different database types (for example, hybrid in-memory and conventional databases) according to particular needs, desires, or particular implementations of the computer 1402 and the described functionality. Although illustrated as a single database 1406 in FIG. 14, two or more databases (of the same, different, or combination of types) can be used according to particular needs, desires, or particular implementations of the computer 1402 and the described functionality. While database 1406 is illustrated as an internal component of the computer 1402, in alternative implementations, database 1406 can be external to the computer 1402.

The computer 1402 also includes a memory 1407 that can hold data for the computer 1402 or a combination of components connected to the network 1430 (whether illustrated or not). Memory 1407 can store any data consistent with the present disclosure. In some implementations, memory 1407 can be a combination of two or more different types of memory (for example, a combination of semiconductor and magnetic storage) according to particular needs, desires, or particular implementations of the computer 1402 and the described functionality. Although illustrated as a single memory 1407 in FIG. 14, two or more memories 1407 (of the same, different, or combination of types) can be used according to particular needs, desires, or particular implementations of the computer 1402 and the described functionality. While memory 1407 is illustrated as an internal component of the computer 1402, in alternative implementations, memory 1407 can be external to the computer 1402.

The application 1408 can be an algorithmic software engine providing functionality according to particular needs, desires, or particular implementations of the computer 1402 and the described functionality. For example, application 1408 can serve as one or more components, modules, or applications. Further, although illustrated as a single application 1408, the application 1408 can be implemented as multiple applications 1408 on the computer 1402. In addition, although illustrated as internal to the computer 1402, in alternative implementations, the application 1408 can be external to the computer 1402.

The computer 1402 can also include a power supply 1414. The power supply 1414 can include a rechargeable or non-rechargeable battery that can be configured to be either user- or non-user-replaceable. In some implementations, the power supply 1414 can include power-conversion and management circuits, including recharging, standby, and power management functionalities. In some implementations, the power-supply 1414 can include a power plug to allow the computer 1402 to be plugged into a wall socket or a power source to, for example, power the computer 1402 or recharge a rechargeable battery.

There can be any number of computers 1402 associated with, or external to, a computer system containing computer 1402, with each computer 1402 communicating over network 1430. Further, the terms "client," "user," and other appropriate terminology can be used interchangeably, as appropriate, without departing from the scope of the present disclosure. Moreover, the present disclosure contemplates that many users can use one computer 1402 and one user can use multiple computers 1402.

Described implementations of the subject matter can include one or more features, alone or in combination.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

Wireless connections within the scope of the present disclosure include wireless protocols, such as, 802.15 protocols (e.g., a BLUETOOTH®), 802.11 protocols, 802.20 protocols (e.g., WI-FI®), or a combination of different wireless protocols.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. An apparatus to adjust tension in an endless belt of a work machine, the apparatus comprising:

one or more processors; and a non-transitory computer-readable storage medium coupled to the one or more processors and storing programming instructions for execution by the one or more processors, the programming instructions instruct the one or more processors to:

determine a tension level in a conveyor belt of a conveyor assembly;

compare the tension level to a desired tension level in the conveyor belt of the conveyor assembly;

in response to the tension level not corresponding to the desired tension level in the conveyor belt of the conveyor assembly, determine one of a slip condition of the conveyor belt and a stall condition of the conveyor belt; and determine an adjustment to the tension level of the conveyor belt based on the tension level of the conveyor belt and the one of the slip condition of the conveyor belt and the stall condition of the conveyor belt.

2. The apparatus of claim 1, wherein the programming instructions further comprise programming instructions to instruct the one or more processors to:

generate a control signal configured to cause a controllable subsystem to alter the tension level in the conveyor belt based on the adjustment to the tension level.

3. The apparatus of claim 2, wherein the adjustment to the tension level is an increase to the tension level in the conveyor belt in response to the tension level being less than the desired tension level and the detected one of the slip condition of the conveyor belt and the stall condition of the conveyor belt being a slip condition of the conveyor belt.

4. The apparatus of claim 2, wherein the adjustment to the tension level is a decrease to the tension level in the conveyor belt in response to the tension level being greater than the desired tension level and the detected one of the slip condition of the conveyor belt and the stall condition of the conveyor belt being a stall condition of the conveyor belt.

5. The apparatus of claim 4, wherein the conveyor assembly comprises:

the conveyor belt; and a motive device configured to move the conveyor in response to rotation of at least a portion of the motive device, wherein the programming instructions that instruct the one or more processors to determine one of the slip condition of the conveyor and the stall condition of the conveyor belt comprises programming instructions that instruct the one or more processors to determine the stall condition of the conveyor belt in response to detection of one of a torque of the motive device being greater than a selected torque value, a rotational speed of the motive device being less than a selected rotational speed, and an electrical current being greater than a selected electrical current.

6. The apparatus of claim 2, further comprising the controllable subsystem, wherein the controllable subsystem comprises one of a hydraulic controllable subsystem and an electrical controllable subsystem.

7. The apparatus of claim 1, wherein the conveyor assembly comprises:

the conveyor belt;

a motive device;

a drive roller coupled to the motive device, the motive device configured to rotate the drive roller; and an idler roller, the conveyor belt engaged with the drive roller and the idler roller, the conveyor belt moveable in response to rotation of the drive roller, and the idler roller configured to be rotated in response to movement of the belt, wherein the programming instructions that instruct the one or more processors to determine one of the slip condition of the conveyor and the stall condition of the conveyor belt comprises programming instructions that instruct the one or more processors to determine the slip condition of the conveyor belt in response to detection of a difference between a rotational speed of the idler roller and a rotational speed of the driver roller.

8. The apparatus of claim 1, further comprising a sensor, wherein the programming instructions that instruct the one or more processors to determine the tension level of the conveyor belt of the conveyor assembly comprises programming instructions that instruct the one or more processors to receive, from the sensor, a signal indicative of the tension level of the conveyor belt of the conveyor assembly.

9. The apparatus of claim 8, wherein the conveyor assembly comprises:

the conveyor belt;

a roller on which the conveyor belt moves; and a tensioner configured to impart a force to the roller.

10. The apparatus of claim 9, wherein the sensor is configured to sense a load in the tensioner, the load in the tensioner indicative of tension of the conveyor belt of the conveyor assembly.

11. A non-transitory computer readable medium storing instructions to cause a processor to perform operations comprising:

determining a first tension level in a conveyor belt of a conveyor assembly;

comparing the tension level to a desired tension level in the conveyor belt of the conveyor assembly;

in response to the first tension level not corresponding to the desired tension level in the conveyor belt of the conveyor assembly, determining one of a slip condition of the conveyor belt and a stall condition of the conveyor belt; and determining a second tension level of the conveyor belt based on the first tension level of the conveyor belt and the one of the slip condition of the conveyor belt and the stall condition of the conveyor belt.

12. The non-transitory computer readable medium of claim 11, further storing instructions to cause the processor to perform the operations comprising:

generating a control signal configured to cause a controllable subsystem to change the first tension level in the conveyor belt to be the second tension level.

13. The non-transitory computer readable medium of claim 12, wherein the control signal is configured to cause the controllable subsystem to increase tension in the conveyor belt in response to the first tension level being less than the desired tension level and the detected one of the slip condition of the conveyor belt and the stall condition of the conveyor belt being a slip condition of the conveyor belt.

14. The non-transitory computer readable medium of claim 13, further storing instructions to cause the processor to perform the operation comprising actuating, in response to the generated control signal, an actuator of the controllable subsystem to alter a load applied to a roller of conveyor assembly to cause the first tension level to increase to the second tension level.

15. The non-transitory computer readable medium of claim 12, wherein the control signal is configured to cause the controllable subsystem to decrease tension in the conveyor belt in response to the first tension level being greater than the desired tension level and the detected one of the slip condition of the conveyor belt and the stall condition of the conveyor belt being a stall condition of the conveyor belt.

16. The non-transitory computer readable medium of claim 15, further storing instructions to cause the processor to perform the operations comprising actuating, in response to the generated control signal, an actuator of the controllable subsystem to alter a load applied to a roller of conveyor assembly to cause the first tension level to decrease to the second tension level.

17. The non-transitory computer readable medium of claim 11, wherein determining one of the slip condition of the conveyor and the stall condition of the conveyor belt comprises determining the slip condition of the conveyor belt in response to detection of a difference between a rotational speed of an idler roller of the conveyor assembly and a rotational speed of a driver roller of the conveyor assembly.

18. The non-transitory computer readable medium of claim 11, wherein determining the tension condition of the conveyor belt of the conveyor assembly comprises sensing, with a sensor, at least one of a force applied to one of a driver roller of the conveyor assembly and a force applied to an idler roller of the conveyor assembly and a separation distance between the driver roller and the idler roller.

19. The non-transitory computer readable medium of claim 11, wherein sensing the tension condition of the conveyor belt of the conveyor assembly comprises sensing, with the sensor, a load in a tensioner of the conveyor assembly, the sensed load indicative of the tension in the conveyor belt.

20. A computer-implemented method comprising:

determining a first tension level of a first side of a conveyor belt of a conveyor assembly;

determining a second tension level of a second side of the conveyor belt;

altering one of the first tension level and the second tension level when the first tension level and the second tension level are not equal;

determining one of a slip condition of the conveyor belt and a stall condition of the conveyor belt; and determining a third tension level in one of the first side and the second side of the conveyor belt based on the detected first tension level and the one of the slip condition of the conveyor belt and the stall condition of the conveyor belt.

* * * * *